United States Patent
Karunakaran et al.

(10) Patent No.: US 11,285,445 B2
(45) Date of Patent: Mar. 29, 2022

(54) CO2-PHILIC THIN FILM COMPOSITE MEMBRANES

(71) Applicant: King Abdullah University of Science and Technology, Thuwal (SA)

(72) Inventors: Madhavan Karunakaran, Thuwal (SA); Mahendra Kumar, Thuwal (SA); Rahul Shevate, Thuwal (SA); Faheem Hassan Akhtar, Thuwal (SA); Klaus-Viktor Peinemann, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 367 days.

(21) Appl. No.: 16/428,480

(22) Filed: May 31, 2019

(65) Prior Publication Data
US 2019/0366277 A1 Dec. 5, 2019

Related U.S. Application Data

(60) Provisional application No. 62/678,365, filed on May 31, 2018.

(51) Int. Cl.
*B01D 71/42* (2006.01)
*B01D 71/52* (2006.01)
(Continued)

(52) U.S. Cl.
CPC ............ *B01D 71/42* (2013.01); *B01D 53/228* (2013.01); *B01D 71/52* (2013.01); *C08L 33/20* (2013.01);
(Continued)

(58) Field of Classification Search
None
See application file for complete search history.

(56) References Cited

U.S. PATENT DOCUMENTS 5,236,592 A * 8/1993 Dejardin ................. C08L 33/20
210/500.35

FOREIGN PATENT DOCUMENTS

KR 101712000 B1 * 3/2017 ............. B01D 71/42

OTHER PUBLICATIONS

Karunakaran, Madhavan et al., "CO2-Philic Thin Film Composite Membranes: Synthesis and Characterization of PAN-r-PEGMA Copolymer", Polymers, 2017, 9, 219. (Year: 2017).*

(Continued)

*Primary Examiner* — Jason M Greene
(74) *Attorney, Agent, or Firm* — Billion & Armitage

(57) ABSTRACT

Embodiments of the present disclosure describe a copolymer composition comprising a polyether-based copolymer, wherein the copolymer dissolves in one or more of an alcohol and alcohol-water mixture. Embodiments of the present disclosure describe a thin-film composite membrane comprising a porous support and a selective layer comprising a polyether-based copolymer, wherein the polyether-based copolymer dissolves in one or more of an alcohol and alcohol-water mixture. Embodiments of the present disclosure describe a method of capturing one or more chemical species comprising contacting a thin-film composite membrane with a fluid composition, wherein the fluid composition includes at least $CO_2$ and capturing $CO_2$ from the fluid composition. Embodiments of the present disclosure also describe methods of synthesizing copolymer compositions and methods of fabricating composite membranes.

14 Claims, 14 Drawing Sheets

(51) Int. Cl.
    *C08L 33/20*     (2006.01)
    *C08L 71/00*     (2006.01)
    *B01D 53/22*     (2006.01)
    *B01D 69/12*     (2006.01)
    *B01D 69/10*     (2006.01)

(52) U.S. Cl.
    CPC .............. *C08L 71/00* (2013.01); *B01D 69/10* (2013.01); *B01D 69/12* (2013.01); *B01D 2257/504* (2013.01); *B01D 2325/02* (2013.01); *B01D 2325/04* (2013.01); *B01D 2325/20* (2013.01)

(56) References Cited

OTHER PUBLICATIONS

English language machine translation for KR 101712000 B1. Retrieved from translationportal.epo.org on Jul. 27, 2021. (Year: 2021).*
Anderson, et al., "Conjugated Polymer Films for Gas Separations", Science, vol. 252, Jun. 7, 1991, pp. 1412-1415.
Asatekin, et al., "Anti-Fouling Ultrafiltration Membranes Containing Polyacrylonitrile-graft-poly(ethylene oxide) Comb Copolymer Additives", Journal of Membrane Science, vol. 298, 2007, pp. 136-146.
Baker, "Future Directions of Membrane Gas Separation Technology", Industrial and Engineering Chemistry Research, vol. 41, Feb. 21, 2002, pp. 1393-1411.
Baker, et al., "Gas Separation Membrane Materials: A Perspective", Macromolecules, vol. 47, Sep. 17, 2014, pp. 6999-7013.
Baker, et al., "Natural Gas Processing with Membranes: An Overview", Industrial and Engineering Chemistry Research, vol. 47, No. 7, Feb. 28, 2008, pp. 2109-2121.
Barelli, et al., "Hydrogen Production Through Sorption-Enhanced Steam Methane Reforming and Membrane Technology: A Review", Energy, vol. 33, 2008, pp. 554-570.
Beevers, "Dependence of the Glass Transition Temperature of Polyacrylonitrile on Molecular Weight", Journal of Polymer Science: Part A, vol. 2, 1964, pp. 5257-5265.
Bondar, et al., "Gas Sorption and Characterization of Poly(ether-b-amide) Segmented Block Copolymers", Journal of Polymer Science Part B: Polymer Physics, vol. 37, 1999, pp. 2463-2475.
Bondar, et al., "Gas Transport Properties of Poly(Ether-b-Amide) Segmented Block Copolymers", Journal of Polymer Science Part B: Polymer Physics, vol. 38, 2000, pp. 2051-2062.
Car, et al., "Pebax(R)/Polyethylene Glycol Blend Thin Film Composite Membranes for CO2 Separation: Performance With Mixed Gases", Separation and Purification Technology, vol. 62, 2008, pp. 110-117.
Car, et al., "Tailor-Made Polymeric Membranes Based on Segmented Block Copolymers for CO2 Separation", Advanced Functional Materials, vol. 18, 2008, pp. 2815-2823.
Descamps, et al., "Efficiency of an Integrated Gasification Combined Cycle (IGCC) Power Plant Including CO2 Removal", Energy, vol. 33, 2008, pp. 874-881.
Du, et al., "Advances in High Permeability Polymeric Membrane Materials for CO2 Separations", Energy and Environmental Science, vol. 5, Dec. 2, 2011, pp. 7306-7322.
Fam, et al., "Improving CO2 Separation Performance of Thin Film Composite Hollow Fiber With Pebax(R)1657/Ionic Liquid Gel Membranes", Journal of Membrane Science, vol. 537, 2017, pp. 54-68.
Feng, et al., "Gas Separation Mechanism of CO2 Selective Amidoxime-poly(1-trimethylsilyl-1-propyne) Membranes", Polymer Chemistry, vol. 8, May 2017, pp. 1-10.
Ismail, et al., "Production of Super Selective Polysulfone Hollow Fiber Membranes for Gas Separation", Polymer, vol. 40, Nov. 1999, pp. 6499-6506.
Janevieve, et al., "Thermoresponsive Copolymers of Methacrylic Acid and Poly(Ethylene Glycol) Methyl Ether Methacrylate", Journal of Polymer Science Part A: Polymer Chemistry, vol. 43, 2005, pp. 6095-6104.
Kim, et al., "Gas Diffusivity, Solubility and Permeability in Polysulfone-poly(Ethylene Oxide) Random Copolymer Membranes", Journal of membrane science, vol. 372, 2011, pp. 116-124.
Lee, et al., "CO2-philic PBEM-g-POEM Comb Copolymer Membranes: Synthesis, Characterization and CO2/N2 Separation", Journal of Membrane Science, vol. 502, 2016, pp. 191-201.
Li, et al., "Carbon Dioxide Selective Mixed Matrix Composite Membrane Containing ZIF-7 Nano-fillers", Journal of Membrane Science, vol. 425-426, 2013, pp. 235-242.
Lin, et al., "Gas Solubility, Diffusivity and Permeability in Poly(Ethylene Oxide)", Journal of Membrane Science, vol. 239, 2004, pp. 105-117.
Liu, et al., "Recent Progress in the Design of Advanced PEO-Containing Membranes for CO2 Removal", Progress in Polymer Science, vol. 38, 2013, pp. 1089-1120.
Merkel, et al., "Power Plant Post-Combustion Carbon Dioxide Capture: An Opportunity for Membranes", Journal of Membrane Science, vol. 359, 2010, pp. 126-139.
Minhas, et al., "Formation of Asymmetric Cellulose Acetate Membranes for the Separation of Carbon Dioxide-methane Gas Mixtures", Industrial and Engineering Chemistry Research, vol. 26, Issue 11, 1987, pp. 2344-2348.
Nagai, et al., "Poly[1-(trimethylsilyl)-1-propyne] and Related Polymers: Synthesis, Properties and Functions", Progress in Polymer Science, vol. 26, 2001, pp. 721-798.
Okamoto, et al., "Gas Permeation Properties of Poly(Ether Imide) Segmented Copolymers", Macromolecules, vol. 28, 1995, pp. 6950-6956.
Park, et al., "A Highly Selective PEGBEM-g-POEM Comb Copolymer Membranefor CO2/N2 Separation", Journal of Membrane Science, vol. 492, 2015, pp. 452-460.
Patel, et al., "Synthesis of Amphiphilic PCZ-r-PEG Nanostructural Copolymers and Their Use in CO2/N2 Separation Membranes", Chemical Engineering Journal, vol. 254, 2014, pp. 46-53.
Petersen, et al., "Novel Polyamide Composite Membranes for Gas Separation Prepared by Interfacial Polycondensation", Journal of Applied Polymer Science, vol. 63, 1997, pp. 1557-1563.
Powell, et al., "Polymeric CO2/N2 Gas Separation Membranes for the Capture of Carbon Dioxide From Power Plant Flue Gases", Journal of Membrane Science, vol. 279, 2006, pp. 1-49.
Rana, et al., "Oxygen-Nitrogen Separation", Encyclopedia of Membrane Science and Technology, vol. 3, Sep. 27, 2013, pp. 1668-1692.
Reijerkerk, et al., "Subambient Temperature CO2 and Light Gas Permeation Through Segmented Block Copolymers With Tailored Soft Phase", ACS Applied Materials and Interfaces, vol. 2, No. 2, 2010, pp. 551-560.
Robeson, "The Upper Bound Revisited", Journal of Membrane Science, vol. 320, 2008, pp. 390-400.
Sanders, et al., "Energy-Efficient Polymeric Gas Separation Membranes for a Sustainable Future: A Review", Polymer, vol. 54, 2013, pp. 4729-4761.
Savoji, et al., "Influence of Novel Surface Modifying Macromolecules and Coagulation Media on the Gas Permeation Properties of Different Polymeric Gas Separation Membranes", Journal of Applied Polymer Science, vol. 124, 2012, pp. 2300-2310.
Savoji, et al., "Novel Surface Modifying Macromolecules (SMMs) Blended Polysulfone Gas Separation Membranes by Phase Inversion Technique", Journal of Applied Polymer Science, vol. 124, 2012, pp. 2287-2299.
Stern, "Polymers for Gas Separations: The Next Decade", Journal of Membrane Science, vol. 94, 1994, pp. 1-65.
Talakesh, et al., "Gas Separation Properties of Poly(Ethylene Glycol)/Poly(Tetramethylene Glycol) Based Polyurethane Membranes", Journal of Membrane Science, vol. 415-416, 2012, pp. 469-477.
Wind, et al., "Natural Gas Permeation in Polyimide Membranes", Journal of Membrane Science, vol. 228, 2004, pp. 227-236.

(56) References Cited

OTHER PUBLICATIONS

Yave, et al., "Design, Synthesis, Characterization and Optimization of PTT-b-PEO Copolymers: A New Membrane Material for CO2 Separation", Journal of Membrane Science, vol. 362, 2010, pp. 407-416.

* cited by examiner

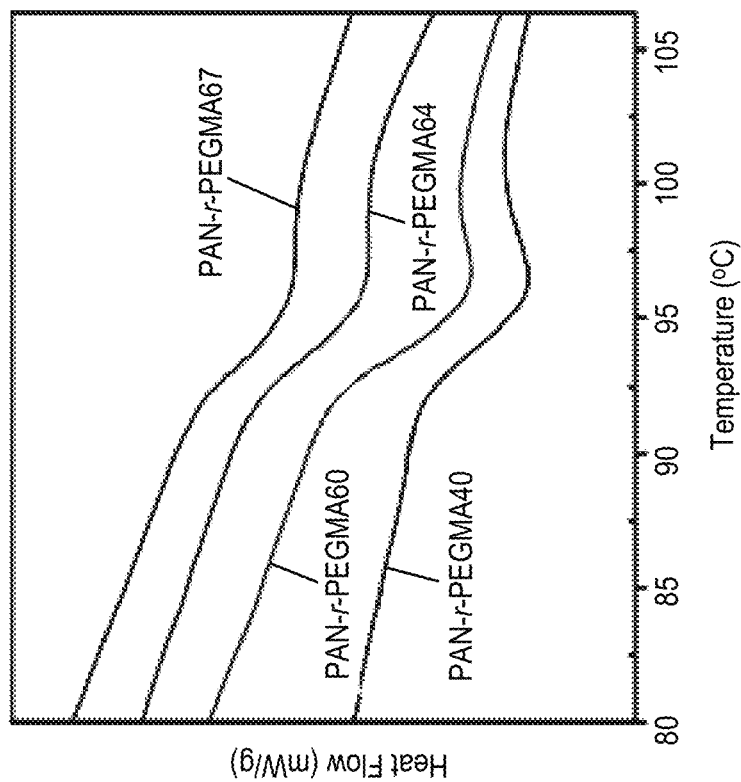
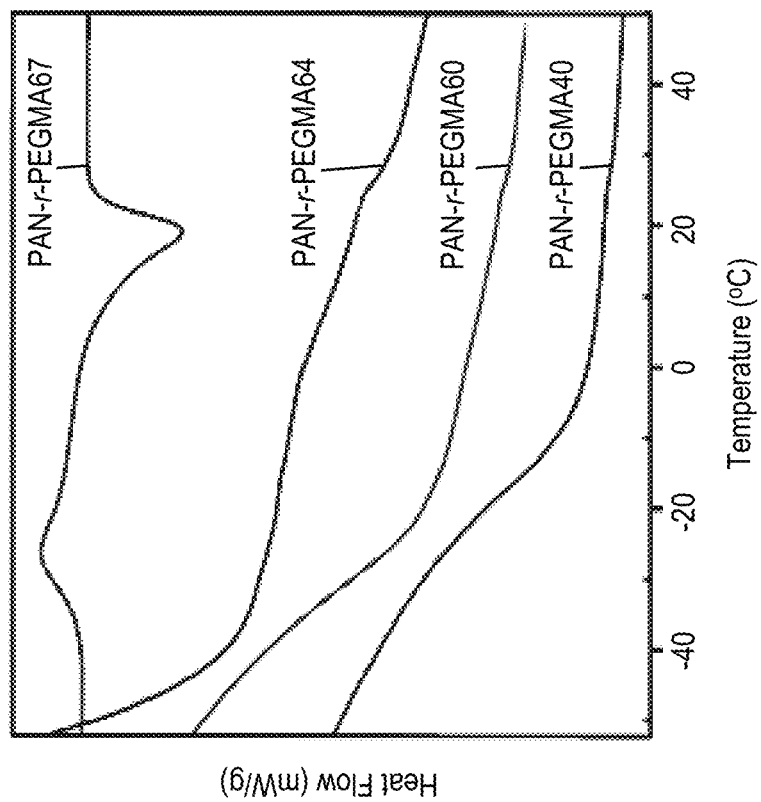
FIG. 7B
FIG. 7A

CO2-PHILIC THIN FILM COMPOSITE MEMBRANES

BACKGROUND

Separation of carbon dioxide from light gases, such as methane, hydrogen and nitrogen has been widely applied in natural gas sweetening, post-combustion (flue gas stream) and pre-combustion. $CO_2$ membrane-based gas separation has experienced significant growth in the past few decades relative to conventional separation processes (e.g., absorption, adsorption, and cryogenic distillation) because of its simplicity, low cost, high efficiency, and low ecological footprint. However, continuous improvement in membrane separation performance and cost reduction is required to remain competitive. In terms of membrane separation performance, polymer membranes suffer from a trade-off relationship, i.e., the higher the permeability, the lower the selectivity. For efficient gas separation membranes, it is important to have polymer membranes with high permeability, as well as high selectivity. To be a competitive candidate for $CO_2$ separation, it is envisioned that polymer membranes should have $CO_2$ permeance of about 1000 GPU (Gas permeation unit, 1 GPU=$10^{-6}$ cm$^3$ (STP)/(s·cm$^2$·cmHg)) and an ideal $CO_2/N_2$ selectivity greater than 30. Various polymer membranes such as polysulfone, cellulose acetate, polyamides, polyimides, polyacetylenes, polycarbonates, poly (phenylene oxide), poly(ethylene oxides), and polyaniline have been developed. However, only a few of them have been explored for industrial application as commercial membranes due to their poor performance and scalability. Thus, the aforementioned obstacles need to be overcome in order to promote commercialization of polymer membranes in industrial gas separation process.

It has been noticed that polyether-based materials (PEG or PEO) are one class of polymer materials which have outstanding $CO_2$ selectivity due to the strong affinity of the available polar ethylene oxide group towards $CO_2$. However, the neat PEO has a strong tendency to crystallize due to the helical structure of the chains, which leads to a significant reduction in gas permeability. To effectively suppress the crystalline characteristic of PEO chains, various strategies have been proposed by copolymerizing PEG monomers with hard segment, grafting or crosslinking PEG segments. Several PEO copolymer membranes such as poly(amide-b-ethylene oxide) (PA-b-PEO), poly(butylene terephthalate-b-ethylene oxide) (PBT-b-PEO), polycarbonate Z-r-poly(ethylene glycol) (PCZ-r-PEG), poly(sulfone-b-ethylene oxide) (PSF-b-PEO), poly(ethylene oxide)-r-poly (propylene oxide) (PEO-r-PPO-T6T6T), poly(ethylene glycol) biphenyl ether methacrylate-g-poly(oxyethylene methacrylate) PEGBEMg-POEM, poly(ethylene glycol)/poly(tetramethylene glycol), poly(trimethylene terephthalate)-b-poly(ethylene oxide) (PTT-b-PEO), and poly(2-[3, [3-(2H-benzotriazol-2-yl)-4-hydroxyphenyl] ethylmethacrylate)-g-poly(oxyethylenemethacryalate) (PBEM-g-POEM) have been reported with slightly improved $CO_2$ permeability and selectivity. However, such materials still fail to overcome the challenges of crystallization of PEO.

Accordingly, it would be desirable to provide a copolymer composition that may be easily synthesized and may be readily used in simple scalable methods for preparation of composite membranes with a high selectivity and high permeability towards $CO_2$.

SUMMARY

In general, embodiments of the present disclosure describe copolymer compositions, methods of synthesizing copolymer compositions, thin film composite membranes based on the copolymer compositions, methods of fabricating the thin film composite membranes, and methods of separating chemical species using the thin film composite membranes.

Accordingly, embodiments of the present disclosure describe a copolymer composition comprising a polyether-based copolymer, wherein the copolymer dissolves in one or more of an alcohol and alcohol-water mixture.

Embodiments of the present disclosure further describe a method of synthesizing a copolymer comprising contacting monomer A and a monomer B in a presence of an initiator to form a reaction mixture, wherein at least one of the monomers includes an ether group; and heating the reaction mixture sufficient to form a polyether-based copolymer that dissolves in one or more of an alcohol and alcohol-water mixture.

Embodiments of the present disclosure describe a thin-film composite membrane comprising a porous support and a selective layer comprising a polyether-based copolymer, wherein the polyether-based copolymer dissolves in one or more of an alcohol and alcohol-water mixture.

Embodiments of the present disclosure describe a method of fabricating a thin-film composite membrane comprising dissolving a polyether-based copolymer in one or more of an alcohol and alcohol-water mixture to form a copolymer solution and contacting a porous support with the copolymer solution to form a $CO_2$-philic thin-film composite membrane.

Embodiments of the present disclosure describe a method of capturing one or more chemical species comprising contacting a thin-film composite membrane with a fluid composition, wherein the fluid composition includes at least $CO_2$ and capturing $CO_2$ from the fluid composition.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which:

FIGS. 7A-7B is a graphical view of differential scanning calorimetry thermograms for PAN-r-PEGMA copolymers, according to one or more embodiments of the present disclosure.

DETAILED DESCRIPTION

Figure 1:
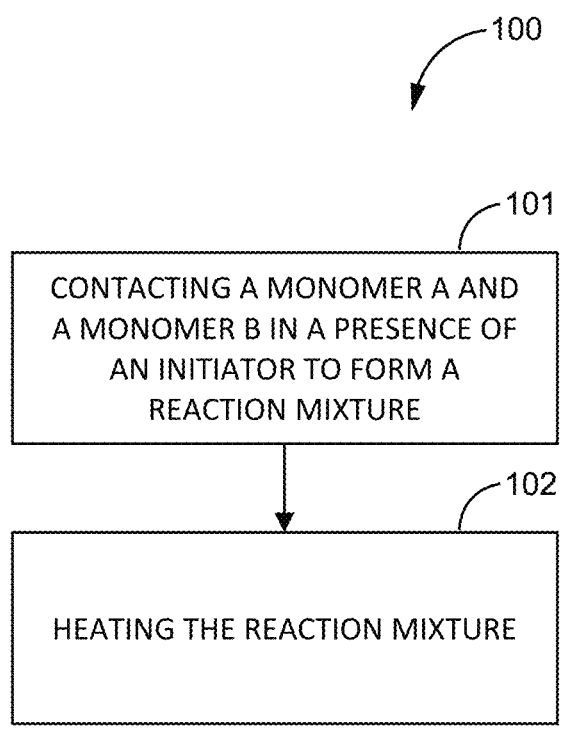
FIG. 1 is a flowchart of a method of synthesizing a copolymer, according to one or more embodiments of the present disclosure.

The invention of the present disclosure relates to copolymer compositions, methods of synthesizing the copolymer compositions, thin film composite membranes based on the copolymer compositions, methods of fabricating the thin film composite membranes, and methods of capturing one or more chemical species using the thin film composite membranes. The copolymer compositions are easily synthesized and may be readily used in simple scalable methods in the preparation of $CO_2$-philic composite membranes, without undesirable crystallization of the polyether-containing segment or monomer. In many embodiments, the copolymer compositions are polyether-based copolymer compositions. The polyether-based copolymer compositions may include a polar ether oxygen that exhibits a strong affinity for $CO_2$. The incorporation of the polyether-based copolymer compositions into composite membranes produces membranes with a strong affinity for $CO_2$. In addition, the polyether-based copolymer compositions dissolve in alcohol and alcohol-water mixtures. In this way, thin-film composite membranes may be fabricated using simple scalable methods, such as dip-coating, to produce membranes with a high selectivity and high permeability towards $CO_2$.

Embodiments of the present disclosure describe copolymer compositions. In many embodiments, the copolymer compositions are polyether-based copolymers that may be dissolved or dissolve in alcohol solvents (e.g., alcohols) and/or alcohol-containing solvents (e.g., alcohol-water mixtures) and may be used in the fabrication of composite membranes (e.g., thin film composite membranes, $CO_2$-philic thin film composite membranes, etc.) for various applications (e.g., $CO_2$-related applications). In an embodiment, the copolymer compositions may be amorphous or substantially amorphous, without any significant crystallization of polyether-containing segment or monomer unit. In many embodiments, the composite membranes may comprise thin film composite membranes. The thin film composite membranes may include a porous polymer support and a selective layer (e.g., a thin dense selective layer). In an embodiment, a selective layer of the thin film composite membrane may comprise or be fabricated from the copolymer composition (e.g., polyether-based copolymers). In an embodiment, the thin film composite membranes may exhibit $CO_2$-philic characteristics. For example, thin film composite membranes comprising the copolymer compositions of the present disclosure as selective layers may be used for $CO_2$-related applications ($CO_2$ gas separation applications), among other things.

The composite membranes of the present disclosure exhibit many characteristics for gas separation applications that are superior to conventional composite membranes. The composite membranes may exhibit outstanding $CO_2$ selectivity. For example, the polar ether oxygen of the selective layer may exhibit a strong affinity towards $CO_2$. The $CO_2$-philic nature of the composite membranes may be based on Lewis acid-base interactions between the ether oxygen (Lewis base) and the $CO_2$ molecule (Lewis acid). The copolymer compositions, methods of fabricating the copolymer compositions, and composite membranes of the present disclosure may overcome various challenges associated with conventional copolymer compositions, such as, a strong tendency to crystallize due to the helical structure of the chains, which leads to significant reductions in gas permeability. In addition, the copolymer compositions may be dissolved (e.g., readily dissolved), in alcohol solvents or alcohol-containing solvents without the use of aprotic solvents, which may damage the porous support. Accordingly, the copolymer compositions may be commercialized and readily incorporated into commercially available membranes for a variety of applications.

Definitions

The terms recited below have been defined as described below. All other terms and phrases in this disclosure shall be construed according to their ordinary meaning as understood by one of skill in the art.

As used herein, "capturing" refers to the act of removing one or more chemical species from a bulk fluid composition (e.g., gas/vapor, liquid, and/or solid). For example, "capturing" may include, but is not limited to, interacting, bonding, diffusing, adsorbing, absorbing, reacting, and sieving, whether chemically, electronically, electrostatically, physically, or kinetically driven.

As used herein, "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo. Accordingly, adding, stirring, treating, tumbling, vibrating, shaking, mixing, and applying are forms of contacting to bring two or more components together.

As used herein, "contacting" may, in addition or in the alternative, refer to, among other things, coating, dip-coating, immersing, submerging, and other methods known in the art.

As used herein, "contacting" may, in addition or in the alternative, refer to, among other things, feeding, flowing, passing, injecting, introducing, and/or providing the fluid composition (e.g., a feed gas).

As used herein, "dissolving" refers to providing one or more of a uniform, about uniform, and substantially uniform distribution.

As used herein, "heating" refers to increasing a temperature. For example, heating may refer to exposing or subjecting any object, material, etc. to a temperature that is greater than a current or previous temperature. Heating may also refer to increasing a temperature of any object, material, etc. to a temperature that is greater than a current or previous temperature of the object, material, etc.

As used herein, "polyether-based" refers to any material containing one or more ether groups. The material may include, but is not limited to, a monomer, segment, polymer (e.g., copolymer). As used herein, "monomer" generally refers to any compound from which a copolymer is fabricated. As used herein, "monomer unit" generally refers to any segment or chain of a copolymer. As used herein, "segment" generally refers to any monomer unit or chain of a copolymer. In some embodiments of the present disclosure, the terms monomer, monomer unit, and segment are used interchangeably.

As used herein, "PEG" refers to polyethylene glycol. As used herein, "PEO" refers to polyethylene oxide. As used herein, "PEG" and "PEO" refer to compounds with the same or similar chemical structure and accordingly may be used interchangeably herein. In an embodiment, PEG may refer to a compound with a chemical structure that is the same as or similar to PEO, but may be characterized as a low to medium range molar mass polymer. In an embodiment, PEO may refer to a compound with a chemical structure that is the same or similar to PEG, but may be characterized as a high molar mass polymer.

Embodiments of the present disclosure describe a copolymer composition comprising a polyether-based copolymer. In many embodiments, the copolymer composition comprises a polyether-based copolymer, wherein the polyether-based copolymer includes any copolymer including or based on polyether. For example, in an embodiment, the copolymer composition comprises a polyether-based copolymer, wherein the polyether-based copolymer includes any copolymer including one or more ether groups. In many embodiments, the polyether-based copolymer is synthesized via a free radical polymerization reaction. For example, in an embodiment, the polyether-based copolymer is synthesized via a one-step free radical polymerization reaction. In an embodiment, the polyether-based copolymer is synthesized via a free radical polymerization reaction at elevated temperature. In many embodiments, the copolymer composition and/or polyether-based compound is or may be characterized as a random copolymer.

In an embodiment, the copolymer composition comprises a polyether-based copolymer, wherein the polyether-based copolymer includes or is characterized by a segment or monomer unit that contains at least one ether group (e.g., an ether-containing segment or ether-containing monomer). For example, in some embodiments, the copolymer composition comprises a polyether-based copolymer including at least one polyether segment, wherein the copolymer dissolves in one or more of an alcohol and alcohol-water mixture. In some embodiments, the copolymer composition comprises a polyether-based copolymer, wherein the polyether-based copolymer includes a segment A and a segment B, wherein at least one of the segments contains at least one ether group. In an embodiment, one or more of the segment A and the segment B contains at least one ether group. In an embodiment, the segment A contains at least one ether group. In an embodiment, the segment B contains at least one ether group. In other embodiments, the copolymer composition comprises a polyether-based copolymer, wherein the polyether-based copolymer includes one or more segments, wherein at least one of the segments contains an ether group.

In an embodiment, the copolymer composition comprises a polyether-based copolymer, wherein the polyether-based copolymer is fabricated from a monomer including at least one ether group (e.g., ether-containing monomer). In some embodiments, the copolymer composition comprises a polyether-based copolymer, wherein the polyether-based copolymer is fabricated from a monomer A and a monomer B, wherein at least one of the monomers includes at least one ether group. In an embodiment, one or more of the monomer A and monomer B include at least one ether group. In an embodiment, the monomer A includes at least one ether group. In an embodiment, the monomer B includes at least one ether group. In other embodiments, the copolymer composition comprises a polyether-based copolymer, wherein the polyether-based copolymer is fabricated from one or more monomers, wherein at least one of the monomers includes at least one ether group. In some embodiments, the copolymer composition comprises a polyether-based copolymer, wherein the polyether-based copolymer includes one or more of a polyether and a compound other than a polyether.

The polyether-based copolymers, including one or more of the segments, monomer units, and monomers, may include or contain one or more polyethers and ether groups. In an embodiment, the polyether-based copolymers include or contain one or more of polyethylene glycol and polyethylene oxide. In an embodiment, the polyether-based copolymers include or contain polyethylene glycol. In an embodiment, the polyether-based copolymers include or contain polyethylene oxide. In an embodiment, the polyether-based copolymers include or contain poly(ethylene glycol) methyl ether methacrylate (PEGMA). In an embodiment, the polyether-based copolymers include or contain a hydrophobic compound, which may not be a polyether-related compound. In an embodiment, the compound other than the polyether is acrylonitrile (AN). In a preferred embodiment, the copolymer composition comprises a polyether-based copolymer, wherein the polyether-based copolymer includes one or more of PEGMA and AN. For example, in an embodiment, the copolymer composition and/or polyether-based copolymer is PAN-r-PEGMA. In other embodiments, the polyether-based copolymers include or contain one or more of PEGMA, AN, polystyrene (PS), polymethylmethacrylate (PMMA), polyethylene glycol (PEG), polyethylene oxide (PEO), and methoxy-terminated PEG.

The copolymer composition may dissolve in one or more of an alcohol and alcohol-water mixture. At least one advantage of the copolymer compositions and/or polyether-based copolymers of the present disclosure is that the copolymer composition and/or polyether-based copolymer may be used to fabricate composite membranes via simple scalable procedures without the use of aprotic solvents, which may damage or damage the porous support of the composite membrane. In an embodiment, the copolymer composition or polyether-based copolymer dissolves in an alcohol. In an embodiment, the copolymer composition or polyether-based copolymer dissolves in an alcohol-water mixture. In an embodiment, the copolymer composition or polyether-based copolymer dissolves in an ethanol-water mixture. In an embodiment, the copolymer composition or polyether-based copolymer dissolves in an ethanol-water mixture of about 7:3 w/w and/or 70/30 v/v. In an embodiment, the copolymer composition or polyether-based copolymer dissolves in a solvent other than an aprotic solvent. In an embodiment, the aprotic solvent includes, among others, one or more of tetrahydrofuran (THF), N,N-dimethylformamide (DMF), N-methylpyrrolidone (NMP), acetonitrile, and dimethyl sulfoxide (DMSO).

A number average molecular weight of the copolymer composition may be greater than about 40 kDa. In many embodiments, the molecular weight of the copolymer composition ranges from about 40 kDa to about 60 kDa. In an embodiment, the molecular weight of the copolymer composition may range from about 43 kDa to about 56 kDa. In an embodiment, the molecular weight of the copolymer composition may be about 44 kDa. In an embodiment, the molecular weight of the copolymer composition may be about 52 kDa. In an embodiment, the molecular weight of the copolymer composition may be about 54 kDa. In an embodiment, the molecular weight of the copolymer composition may be about 56 kDa. In other embodiments, the molecular weight of the copolymer composition may be less than about 40 kDa or greater than about 50 kDa.

A polydispersity index (PDI) of the copolymer composition may range from about 1 to about 4, or about 1.5 to about 4. In an embodiment, the polydispersity index of the copolymer composition may range from about 1.96 to about 3.6. In an embodiment, the PDI of the copolymer composition is about 1.5, about 2.0, about 2.5, about 3.0, about 3.5, or about 4.0. In an embodiment, the PDI of the copolymer composition is about 1.96. In an embodiment, the PDI of the copolymer composition is about 2.15. In an embodiment, the PDI of the copolymer composition is about 2.39. In an embodiment, the PDI of the copolymer composition is about 3.6. In other embodiments, the PDI of the copolymer composition may be less than about 1.5 or greater than about 4.0.

The copolymer compositions may be thermally stable. In general, a thermal degradation temperature of the copolymers increases gradually with increasing polyether content. Conventional polymers usually decrease in thermal stability with increasing PEG content, for example. Here, however, the thermal stability of the copolymers is unexpectedly enhanced with increasing polyether content. In this way, the copolymer compositions of the present disclosure may increase a selectivity (e.g., polyether content, PEG/PEO content, etc.) of a composite membrane, without a corresponding loss in thermal stability. Instead, the selectivity of composite membranes may increase with an increase in thermal stability.

The copolymer compositions may be amorphous or substantially amorphous, without crystallization or significant crystallization of the polyether or polyether-containing segment. It can be important that the copolymer composition be amorphous or substantially amorphous. The $CO_2$-philic nature of polyether based materials may be based on Lewis acid-base interaction between the ether oxygen (Lewis base) and the $CO_2$ molecule (Lewis acid). However, in conventional materials, the neat PEO has a strong tendency to crystallize due to the helical structure of the chains that lead to a significant reduction in gas permeability. Here, however, the reduction or absence of any crystallization enhances gas permeability and provides a copolymer composition and composite membrane that are superior to conventional materials.

In an embodiment, the copolymer composition comprises a polyether-based copolymer, wherein the polyether-based copolymer includes one or more of acrylonitrile and poly (ethylene glycol) methyl ether methacrylate. In an embodiment, the copolymer composition is polyacrylonitrile-r-poly (ethylene glycol) methyl ether methacrylate (PAN-r-PEGMA). In an embodiment, the polyether-based copolymer is PAN-r-PEGMA. In an embodiment, the polyether-based copolymer is soluble in an-ethanol water mixture.

FIG. 1 is a flowchart of a method of synthesizing a copolymer composition, according to one or more embodiments of the present disclosure. As shown in FIG. 1, the method may comprise contacting 101 a monomer A and a monomer B in a presence of an initiator to form a reaction mixture and heating 102 the reaction mixture sufficient to form a polyether-based copolymer that dissolves in one or more of an alcohol or alcohol-water mixture. In an embodiment, the method may comprise contacting 101 a monomer A and a monomer B in a presence of an initiator to form a reaction mixture, wherein at least one of the monomers includes a polyether or ether group and heating 102 the reaction mixture sufficient to form a polyether-based copolymer. In many embodiments, at least one of monomer A and monomer B is an ether-containing monomer. In many embodiments, the copolymer composition is synthesized via a free radical polymerization reaction. In an embodiment, the copolymer composition is synthesized via a one-step free radical polymerization reaction.

At step 101, a monomer A and a monomer B are contacted in a presence of an initiator to form a reaction mixture, wherein at least one of the monomer A and monomer B is an ether-containing monomer or polyether-containing monomer. Contacting may include one or more of adding, stirring, and mixing, each of which are examples of forms of contacting to bring two or more components together. In many embodiments, contacting occurs at about room temperature. In many embodiments, the monomer A and monomer B are added sequentially or simultaneously to a reaction medium (e.g., round-bottom flask) that may or may not contain a solvent and/or initiator. In an embodiment, the monomer A and monomer B are added to a reaction medium comprising a solvent and the initiator is added thereafter. In other embodiments, any order may be used and the components may be added simultaneously and/or sequentially. In an optional embodiment, the method may further comprise removing dissolved oxygen from the reaction medium and/or reaction mixture (not shown). For example, in an embodiment, nitrogen gas (e.g., pure nitrogen gas) may be slowly purged sufficient to remove dissolved oxygen.

One or more of the monomers A and monomers B may include an ether-containing monomer or polyether-containing monomer. The terms ether-containing monomer and polyether-containing monomer are used interchangeably herein, as a person skilled in the art would understand any differences. In many embodiments, at least one of the monomers A and monomers B is an ether-containing monomer. In an embodiment, monomer A is an ether-containing monomer and monomer B does not include an ether. For example, in an embodiment, monomer A may include or contain one or more of polyethylene glycol and polyethylene oxide. In an embodiment, monomer A includes polyethylene glycol. In an embodiment, monomer A includes polyethylene oxide. In an embodiment, monomer A includes PEGMA. In an embodiment, monomer B includes AN. In a preferred embodiment, the first monomer is acrylonitrile and the ether-containing monomer is poly(ethylene glycol) methyl ether methacrylate. While the above description describes monomer A as including the polyether and monomer B as not including the polyether, this shall not be limiting because, in other embodiments, monomer B is an ether-containing monomer and monomer A does not include an ether.

In embodiments in which monomer A is the ether-containing monomer and monomer B is not the ether-containing monomer, a mole percentage of monomer A and monomer B may be varied. For example, in an embodiment, a mole percentage of monomer A may range from about 0.1 mol % to about 30 mol %, with the balance comprising monomer B. In an embodiment, a mole percentage of monomer A is about 10 mol % and a mole percentage of monomer B is about 90 mol %. In an embodiment, a mole percentage of monomer A is about 11 mol % and a mole percentage of monomer B is about 89 mol %. In an embodiment, a mole percentage of monomer A is about 16 mol % and a mole percentage of monomer B is about 84 mol %. In an embodiment, a mole percentage of monomer A is about 21 mol % and a mole percentage of monomer B is about 79 mol %. While the above description describes monomer A as including the polyether and monomer B as not including the polyether, this shall not be limiting because, in other embodiments, monomer B is an ether-containing monomer and monomer A does not include an ether, so the mole percentages may be adjusted accordingly.

An ether-containing monomer (e.g., one or more of monomer A or monomer B) of varying initial concentrations may be selected. In an embodiment, a weight percentage of the ether-containing monomer may range from about 40 wt. % to about 70 wt. %. In an embodiment, the weight percentage of the ether-containing monomer is about 40 wt. %. In an embodiment, the weight percentage of the ether-containing monomer is about 60 wt. %. In an embodiment, the weight percentage of the ether-containing monomer is about 64 wt. %. In an embodiment, the weight percentage of the ether-containing monomer is about 67 wt. %. In other embodiments, the weight percentage of the ether-containing monomer may be less than about 40 wt. % or greater than about 70 wt. %.

An ether-containing monomer (e.g., one or more of monomer A or monomer B) of varying molecular weights may be selected. In an embodiment, a molecular weight of the ether-containing monomer may range from about from about 100 Da to about 1000 Da. For example, in a preferred embodiment, a molecular weight of one or more of the ether-containing monomer may be about 300 Da. In a more preferred embodiment, a molecular weight of the ether-containing monomer may about 475 Da. In an even more preferred embodiment, a molecular weight of the ether-containing monomer may about 950 Da.

The initiator may include any free radial initiator. In many embodiments, the initiator is 2,2-azobis(2-methylpropionitrile) (AIBN). In other embodiments, the initiator may include one or more of AIBN, benzoyl peroxide (BPO), and 2,2'-azobis(2-methylbutyronitrile).

The solvent may include any suitable solvent. For example, the solvent may include deuterated dimethyl sulfoxide (DMSO or DMSO-d$^6$). In other embodiments, the solvent may include one or more of DMSO, DMSO-d$^6$, tetrahydrofuran-d$_8$, and acetonitrile-d$_3$.

At step 102, the reaction mixture is heated to form the copolymer. Heating generally refers to exposing or subjecting to a temperature that is greater than a current or previous temperature. In some embodiments, the reaction mixture is stirred or mixed while heating. One or more of the heating and stirring may proceed for a duration ranging from about 1 hour to about 48 hours. In an embodiment, the duration is one or more of about 16 hours and about 24 hours.

The temperature may be greater than about room temperature. In many embodiments, the temperature may range from about 60° C. to about 80° C. In an embodiment, the temperature is about 60° C. In an embodiment, the temperature is about 80° C. In some embodiments, heating includes heating to a first temperature and subsequently heating to a second temperature, wherein the second temperature is greater than the first temperature. For example, in an embodiment, the first temperature is about 60° C. and the second temperature is about 80° C. In other embodiments, the temperature may be less than about 60° C. or greater than about 80° C.

In an embodiment, heating includes heating to a first temperature and subsequently heating to a second temperature, wherein the second temperature is greater than the first temperature. In an embodiment, the first temperature is about 60° C. and the second temperature is about 80° C.

The method may further optionally comprise in any order one or more of cooling the reaction mixture to about room temperature (not shown); precipitating in an organic solvent or organic solvent mixture (e.g., cyclohexane and ethanol at 70/30 v/v %) (not shown); decanting the solvent or solvent mixture (not shown); removing one or more of unreacted monomer, solvent, and initiator (e.g., immersing in a solvent under constant stirring for about 24 h at room temperature) (not shown); filtering the copolymer composition (not shown); and drying the copolymer composition (e.g., in a vacuum over at about 40° C. for about 12 h) (not shown). Each of these steps may be performed using any other methods known in the art.

In an embodiment, the method comprises contacting an acrylonitrile monomer and a polyether monomer in a presence of an initiator to form a reaction mixture and heating the reaction mixture sufficient to form a PAN-r-PEGMA copolymer. Scheme 1 is an example of a method of synthesizing a PAN-r-PEGMA copolymer composition. In particular, Scheme 1 is a reaction route for the synthesis of PAN-r-PEGMA copolymers by free radical polymerization.

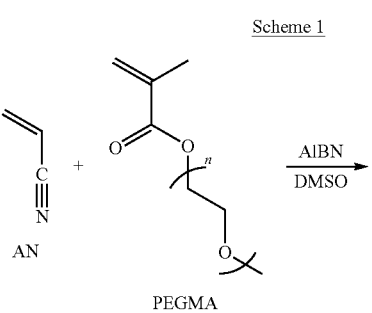

Scheme 1

-continued

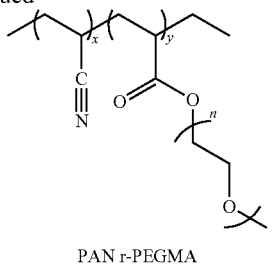

PAN r-PEGMA

Embodiments of the present disclosure describe a thin film composite membrane. The thin film composite membrane may comprise a porous support (e.g., porous polymer support) and a selective layer comprising a polyether-based copolymer. In many embodiments, the polyether-based copolymer dissolves in one or more of an alcohol and alcohol-water mixture. For example, the thin film composite membrane may comprise a porous support and a selective layer comprising a polyether-based copolymer, wherein the polyether-based copolymer dissolves in one or more of an alcohol and alcohol-water mixture. In this way, embodiments of the present disclosure describe thin film composite membranes including a selective layer that may be fabricated on a porous support from a polyether-based copolymer dissolved in an alcohol or alcohol-water mixture by simple methods such as dip-coating, among others.

The porous support may include any suitable porous polymer support. In an embodiment, a suitable porous polymer support includes a support that provides stability, including, but not limited to, mechanical stability. In an embodiment, a suitable porous polymer support includes a support that provides a suitable interface between the support and the selective layer. For example, a suitable interface may be one, wherein the support and selective layer are compatible (e.g., good or strong attachment, adhesion, etc.). In an embodiment, a suitable porous support may include one with requisite porosity and pore size sufficient to provide a composite membrane of the present disclosure with one or more of a high selectivity and high permeability. In an embodiment, the porous polymer support includes polyacrylonitrile (PAN). For example, the porous polymer support may be a porous PAN support membrane. In other embodiments, the porous polymer support may include one or more of PAN, polysulfone (PSF), polyetherimide (PEI), and polyvinylidene difluoride (PVDF).

A thickness of the porous polymer support may range from about 150 µm to about 200 µm. For example, in an embodiment, the thickness of the polymer support is about 150 µm, about 160 µm, about 170 µm, about 180 µm, about 190 µm, or about 200 µm. In other embodiments, the thickness of the porous support may be less than about 150 µm or greater than about 150 µm.

The selective layer may include any of the copolymer compositions of the present disclosure. For example, in an embodiment, the selective layer includes a polyether-based copolymer. In a preferred embodiment, the selective layer includes PAN-r-PEGMA. In many embodiments, the polyether-based copolymer may dissolve in one or more of an alcohol and alcohol-water mixture. In a preferred embodiment, the polyether-based copolymer may dissolve in an ethanol-water mixture. For example, embodiments include an ethanol-water mixture of 70/30 v/v %.

The selective layer may be a thin dense selective layer. In an embodiment, the selective layer may be fabricated as a defect-free selective layer. In an embodiment, the selective layer may be provided as a smooth surface coating of the polyether-based copolymer on a top surface of the porous support. In an embodiment, the selective layer may exhibit a microphase separated morphology.

The selective layer thickness may range from about 1 µm to 2 µm. In an embodiment, the selective layer thickness ranges from about 1.2 µm to about 1.5 µm. In an embodiment, the selective layer thickness ranges from about 1.2 µm to about 1.4 µm. In an embodiment, the selective layer thickness is about 1 µm, about 1.1 µm, about 1.2 µm, about 1.3 µm, about 1.4 µm, about 1.5 µm, about 1.6 µm, about 1.7 µm, about 1.8 µm, about 1.9 µm, or about 2 µm. In other embodiments, the selective layer thickness may range from about 0.01 µm to about 20 µm.

In an embodiment, the thin film composite membrane is a $CO_2$-philic thin film composite membrane. In an embodiment, the composite membrane is a defect free composite membrane. For example, the composite membrane may include a defect free selective layer fabricated on a porous support.

The composite membranes may exhibit a high gas permeability for one or more of $CO_2$, $H_2$, $CH_4$, $O_2$, and $N_2$. In many embodiments, an order of gas permeability of the membranes at about room temperature is about $CO_2 > H_2 > CH_4 > O_2 > N_2$. In an embodiment, the composite membranes exhibit a highest gas permeability for $CO_2$. In many embodiments, the gas permeability of the membrane increases with increasing polyether content (e.g., increasing polyether content of the copolymer composition or polyether-based copolymer). For example, in an embodiment, $CO_2$ permeability of the composite membrane increases (e.g., increases strongly) with increasing content of ether-containing monomer (e.g., PEGMA) in the initial synthesis composition. In addition, in an embodiment, the performance of the composite membrane may be affected by the amount and molecular weight of the ether-containing monomer. In an embodiment, the $CO_2$ gas flux of the composite membrane may be about $1.4 \times 10^{-1}$ m$^3$/m$^2$ h bar.

The composite membranes may exhibit a selectivity for $CO_2$ over one or more other chemical species. The one or more other chemical species may include one or more of $H_2$, $CH_4$, $O_2$, and $N_2$.

In an embodiment, the composite membranes exhibit a selectivity for $CO_2$ over $N_2$. The $CO_2/N_2$ selectivity may increase with increasing content of the ether-containing monomer or segment (e.g., PEGMA). In an embodiment, the $CO_2/N_2$ selectivity may be at least about 65. In an embodiment, the $CO_2/N_2$ selectivity ranges from about 40 to about 70. For example, the $CO_2/N_2$ selectivity may be about 40, about 45, about 50, about 55, about 60, about 65, or about 70. In other embodiments, the selectivity may be less than about 40 or greater than about 70.

In an embodiment, the composite membranes exhibit a selectivity for $CO_2$ over $CH_4$. The $CO_2/CH_4$ selectivity may increase with decreasing content of the ether-containing monomer or segment. In an embodiment, the composite membranes exhibit a selectivity for $O2/N_2$. The $O_2/N_2$ selectivity may range from about 2 to about 4. In an embodiment, the $O_2/N_2$ selectivity is about 2, about 2.5, about 3, about 3.5, or about 4. The $O_2/N_2$ selectivity may increase with decreasing content of the ether-containing monomer or segment. In an embodiment, the $CO_2/N_2$ selectivity and $CO_2/H_2$ selectivity may increase with increasing content of the ether-containing monomer or segment. In many embodiments, the composite membranes are $CO_2$-philic.

The gas flux and selectivity of the composite membranes may be influenced (e.g., strongly influenced) by the concentration of the copolymer coating solution and/or selective layer thickness. For example, in an embodiment, the $CO_2$ flux may increase as the concentration of the copolymer coating solution decreases due to, for example, the reduced thickness of the selective layer. In other embodiments, the selectivity of the composite membranes may be influenced by the concentration of the copolymer coating solution. For example, in an embodiment, the selectivity may decrease as the concentration of the copolymer coating solution decreases due to, for example, the formation of pinholes in the selective layer at lower concentrations of copolymer coating solution.

Figure 2:
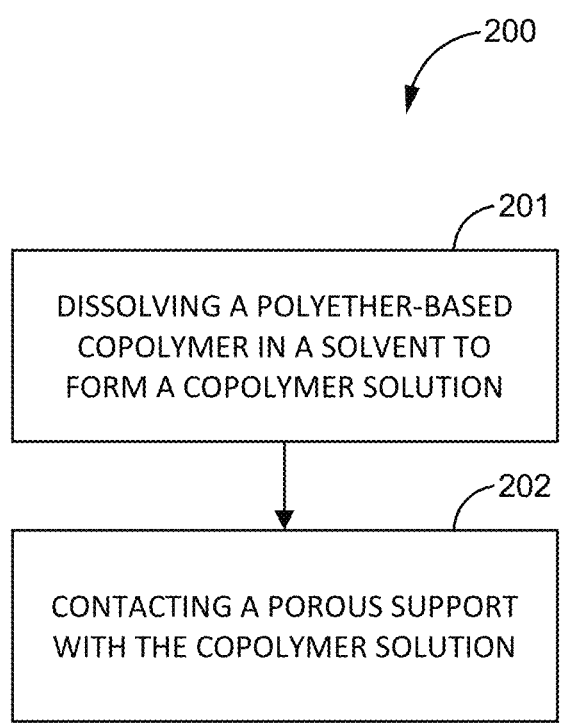
FIG. 2 is a flowchart of a method of fabricating a thin film composite membrane, according to one or more embodiments of the present disclosure.

FIG. 2 is a flowchart of a method of fabricating a thin film composite membrane, according to one or more embodiments of the present disclosure. As shown in FIG. 2, the method may comprise dissolving 201 a polyether-based copolymer in one or more of an alcohol and alcohol-water mixture to form a copolymer solution; and contacting 202 a porous support with the copolymer solution to form a $CO_2$-philic thin-film composite membrane.

At step 201, a polyether-based copolymer is dissolved in one or more of an alcohol and alcohol-water mixture to form a copolymer solution (e.g., a copolymer coating solution). Dissolving may refer to providing a uniform distribution. In an embodiment, dissolving may refer to one or more of disassociating, disentangling, solvating polymer chains, blocks, or segments. In an embodiment, dissolving may proceed at an elevated temperature for a select period of time. The temperature may range from about 20° C. to about 90° C., or preferably from about 50° C. to about 90° C. The select period of time may range from about 4 h to about 24 h. In an embodiment, the elevated temperate is any temperature above room temperature. In an embodiment, the elevated temperature is about 80° C. In other embodiments, the elevated temperature is less than or greater than about 80° C. In an embodiment, the select period of time is about 8 h.

The polyether-based copolymer may include any of the copolymer compositions of the present disclosure. In many embodiments, the copolymer solution ranges from about 0.1 wt. % to about 10 wt. % of polyether-based copolymer. In a preferred embodiment, a concentration of the polyether-based copolymer ranges from about 1 wt. % to about 3 wt. %. In another preferred embodiment, a concentration of the polyether-based copolymer is about 3 wt. %.

The alcohol may include any suitable alcohol. For example, the alcohol may include one or more of methanol, ethanol, n-propanol, isopropanol, and n-butanol. The alcohol-water mixture may include any of the above alcohols in aqueous solution. Depending on the specific polymer and its concentration, the water content may range from about 5% to about 70%, or preferably about 40% to about 50%. The water content may also be greater than about 70% and/or less than about 5%. The water content may be sufficient to obtain a homogenous solution without phase separation. In an embodiment, the alcohol-water mixture is an ethanol-water mixture. In an embodiment, an ethanol water mixture of about 7:3 w/w or 70:30 v/v is used.

At step 202, a porous support is contacted with the copolymer solution to form a thin film composite membrane (e.g., a $CO_2$-philic thin film composite membrane). Contacting may include dip-coating the porous support in the copolymer solution. In some embodiments, contacting may proceed at about room temperature. Any of the porous supports of the present disclosure may be used here.

The method 200 may further comprise the steps of drying at about room temperature and/or removing residual solvent via, for example, vacuum drying. Any methods known in the art for drying and/or removing solvent may be used herein.

In an embodiment, the selective layer may show adhesion to the porous support. For example, in embodiments in which the porous support and a copolymer segment of the selective layer share a common polymer, the adhesion may be a result of good compatibility between the support and the coating, leading to enhanced gas separation properties. This shall not be limiting, however, because in other embodiments, the porous support and copolymer segment of the selective layer may not share a common polymer, but may still exhibit adhesion.

Figure 3:
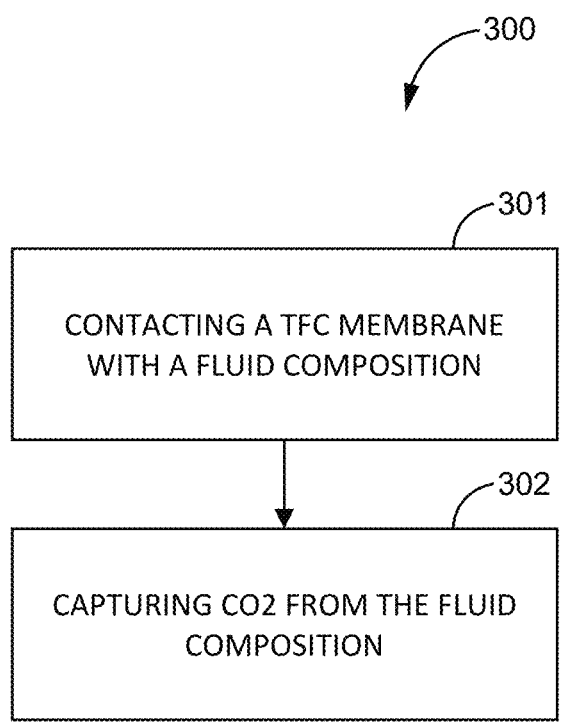
FIG. 3 is a flowchart of a method of separating gas, according to one or more embodiments of the present disclosure.

FIG. 3 is a flowchart of a method of separating gas, according to one or more embodiments of the present disclosure. As shown in FIG. 3, the method may comprise contacting 301 a thin-film composite (TFC) membrane comprising a polyether-based copolymer (e.g., PAN-r-PEGMA) with a fluid composition, wherein the fluid composition includes at least $CO_2$, and capturing 302 $CO_2$ from the fluid composition.

At step 301, a thin-film composite membrane is contacted with a fluid composition. Contacting may include feeding or flowing a fluid composition sufficient to bring it in contact with the thin-film composite membrane. Any of the thin-film composite membranes of the present disclosure may be used herein. In many embodiments, the thin-film composite membrane comprises at least a polyether-based copolymer. In an embodiment, the thin-film composite membrane comprises PAN-r-PEGMA. For example, in an embodiment, the thin-film composite membrane comprises a porous support and a selective layer, wherein the selective layer includes PAN-r-PEGMA. The fluid composition may include any chemical species. In many embodiments, the fluid composition may include at least $CO_2$. In an embodiment, the fluid composition includes one or more of $CO_2$, $H_2$, $CH_4$, $O_2$, and $N_2$.

At step 302, $CO_2$ is captured from the fluid composition. Capturing may include removing one or more chemical species from a bulk fluid composition (e.g., gas/vapor, liquid, and/or solid). In other embodiments, one or more of $CO_2$, $H_2$, $CH_4$, $O_2$, and $N_2$ is captured from the fluid composition.

The following Examples are intended to illustrate the above invention and should not be construed as to narrow its scope. One skilled in the art will readily recognize that the Examiners suggest many other ways in which the invention could be practiced. It should be understand that numerous variations and modifications may be made while remaining within the scope of the invention.

Example 1

This Example describes the successful fabrication of $CO_2$-philic polymer composite membranes using a polyacrylonitrile-r-poly(ethylene glycol) methyl ether methacrylate (PAN-r-PEGMA) copolymer. The series of PAN-r-PEGMA copolymers with various amounts of PEG content was synthesized by free radical polymerization in presence of AIBN initiator and the obtained copolymers were used for the fabrication of composite membranes. The synthesized copolymers show high molecular weights in the range of 44-56 kDa. Thin film composite (TFC) membranes were fabricated by dip coating procedure using PAN-r-PEGMA copolymers and the porous PAN support membrane. Scanning electron microscopy (SEM) and atomic force microscopy (AFM) were applied to analyze the surface morphology of the composite membranes. The microscopy analysis revealed the formation of a defect-free skin selective layer of PAN-r-PEGMA copolymer over a porous PAN support membrane. Selective layer thickness of the composite membranes ranged from 1.32-1.42 μm. The resulting composite membrane exhibited a $CO_2$ permeance of $1.37 \times 10^{-1}$ m$^3$/m$^2 \cdot$h$\cdot$bar and an ideal $CO_2/N_2$ selectivity of 65. The TFC membranes showed increasing ideal gas pair selectivities in the order of $CO_2/N_2 > CO_2/CH4 > CO_2/H_2$. In addition, the fabricated composite membranes were tested for long-term single gas permeation measurement and these membranes exhibited remarkable stability, confirming that they are good candidates for $CO_2$ separation.

Experimental Section

Chemicals and Materials.

Poly(ethylene glycol) methyl ether methacrylate (PEGMA) with different molecular weights (Mn=300, 475 and 950 g/mol) and acrylonitrile (AN) were purchased from Sigma-Aldrich (Steinheim, Germany). PEGMA and AN monomers were passed through the prepacked column at 0.5 mL/min flow rate to remove hydroquinone and monomethyl ether hydroquinone inhibitors. 2,2-Azobis (2-methylpropionitrile) (AIBN, 98%) initiator was procured from Pfartz & Bauer (Waterbury, UK), which was purified through recrystallization from methanol. DMSO, DMF, cyclohexane, ethanol and deuterated dimethyl sulfoxide (DMSO-d$^6$) were purchased from Sigma-Aldrich and used as such. PAN porous support membranes were purchased from GMT Membrantechnik, Rheinfelden, Germany.

Synthesis of Polyacrylonitrile-r-Polyethylene Glycol Methacrylate (PAN-r-PEGMA) Copolymer.

PAN-r-PEGMA copolymers were synthesized by free radical polymerization reaction using AIBN initiator at elevated temperature. The initial concentrations of PEGMA and acrylonitrile monomers are provided in Table 1. The typical procedure for synthesis of PAN-r-PEGMA copolymers was: AN and PEGMA were alternatively added into a round-bottom flask containing DMSO. To this, AIBN (1 wt % to the total weight of the monomers) was added under stirring at RT and the flask along with resulting reaction mixture was then sealed using a rubber septum. Pure nitrogen gas was further purged slowly for 30 min to remove the dissolved oxygen from a reaction mixture. The reaction mixture was heated to 60° C. with constant stirring for 24 h. After 24 h, the temperature was further raised to 80° C. for an additional 16 h to attain high molecular weight PAN-r-PEGMA copolymer. The solution mixture was cooled to RT and the resulting copolymer solution was precipitated in a 200 mL mixture of cyclohexane and ethanol (70:30 v/v %). The solvent mixture was decanted and 100 mL of ethanol was again poured to remove unreacted monomer and traces of initiator. The copolymer was left in ethanol under constant stirring for 24 h at RT and the copolymer was filtered and then dried in the vacuum oven at 40° C. for 12 h.

TABLE 1

PAN-r-PEGMA with various chemical compositions and their molecular weights.

| Sample Code | Mol (%) AN | Mol (%) PEGMA | PEGMA (Da) | PEGMA wt % | $M_w$ (Da) | $M_w/M_n$ (PDI) |
|---|---|---|---|---|---|---|
| PAN-r-PEGMA40 | 89.3 | 10.7 | 300 | 40 | 56,052 | 2.15 |
| PAN-r-FEGMA60 | 79.0 | 21.0 | 300 | 60 | 55.669 | 2.39 |
| PAN-r-PEGMA64 | 83.6 | 16.4 | 475 | 64 | 43,918 | 1.96 |
| PAN-r-PEGMA67 | 89.9 | 10.1 | 950 | 67 | 52,397 | 3.60 |

Composite Membrane Fabrication.

About 3 wt % of PAN-r-PEGMA copolymer was dissolved in ethanol/water (70/30 v/v %) mixture at 80° C. for 8 h. TFC membranes were then produced by dipping the double side sealed porous PAN support membrane in the copolymer solution and dried at RT. The membranes were then vacuum dried at 50° C. for 24 h to remove residual solvent. To study an effect of coating thickness, copolymer solutions with concentrations of 1, 2 and 3 wt % were used. In all other studies, 3 wt % of PAN-r-PEGMA copolymer was maintained for membrane fabrication.

Characterization.

Fourier transform infrared (FTIR) spectra of the synthesized copolymers were recorded using a Nicolet iS10 spectrometer (Thermo Scientific Co., Waltham, Mass., USA) in the frequency range of 4000-600 cm$^{-1}$. The data were collected for 16 scans with a resolution of 4 cm$^{-1}$ at RT and FTIR spectra were normalized. The $^1$H-NMR spectra were recorded on 600 MHz high-resolution FT-NMR spectrometer (Bruker, Rheinstetten, Germany). DMSO-d$^6$ was used as the solvent and tetramethylsilane as the reference. The thermal behavior of the copolymers was analyzed using a thermal gravimetric analyzer (TGA Q5000, TA Instruments, New Castle, Del., USA). TGA data were recorded for the copolymers in the temperature range of 25-600° C. at the heating rate of 5° C./min under nitrogen environment. DSC measurements (DSC Q2000, TA Instruments) were performed at a heating rate of 10° C./min under nitrogen environment to determine the glass transition temperature ($T_g$) of the synthesized copolymers. The samples were heated from 45-110° C., and the scanned thermograms were used to determine the $T_g$ value of the copolymers. Wide angle X-ray diffraction (WXRD) measurements were conducted on a Bruker D8 Advance X-ray diffractometer with Cu—K radiation ($\lambda$=1.54 Å) operated at 40 kV and 40 mA. The 2-theta angular region between 3° and 50° was explored at a scan rate of 5°/min. The molecular weights of the copolymers were determined by Gel permeation chromatography (GPC; Agilent 1260, Richardson, Tex., USA) equipped with infinity multi-detector using DMF solvent at 45° C. Molecular weights of the copolymers were determined using the narrow molecular weight distribution poly (methyl methacrylate) standards. Morphologies of the membranes were observed on field emission scanning electron microscope (FESEM; FEI Quanta 200, FEI Co., Oregon, USA). Membrane morphologies were recorded at 5 kV accelerating potential and 10 mm working distance. The dried membrane samples were mounted on aluminum stubs using aluminum tape and gold sputtering was carried out on the membranes before recording their SEM images. For cross-section morphology analysis TFC membranes were fractured in liquid nitrogen and their SEM images were recorded. The surface of the composite membranes was characterized by atomic force microscopy (AFM; Model 5400, Agilent) using a silicon nitride tip with a resonance frequency in the range of 76-263 kHz in a tapping mode.

Gas Permeation Measurements.

Single gas permeation experiments were performed using a pressure increase test unit built at KAUST (constant volume, variable pressure). The effective area of TFC membranes was ~13 cm². The permeability of gas through the composite membranes was measured at 25° C. using a pressure increase time-lag apparatus with a feed pressure of 500 mbar. The permeance value of TFC membrane was calculated using Equation (1):

$$J = \frac{V \cdot 22.4}{R \cdot T \cdot A \cdot t} \ln\left(\frac{p_F - p_0}{p_F - p_{P(t)}}\right) \quad (1)$$

where V is the permeate volume (L), R is the ideal gas constant (0.0831 bar·L·mol$^{-1}$·K$^{-1}$), T is the temperature (K), A is the membrane area (m²) and t is the time of measurement (s). $p_F$, $p_0$, and $p_{P(t)}$ (bar) are the pressures at the feed, permeate side at beginning, and permeate side at the end of the measurement, respectively. The membrane selectivity towards the gas was determined from ratio of the permeance for each component.

Results and Discussion

Synthesis of PAN-r-PEGMA Copolymers.

The series of PAN-r-PEGMA copolymers were synthesized via free radical polymerization at elevated temperature using AIBN (Scheme 1). The mole ratio of AN reacted with various molecular weights of PEG methacrylate is tabulated in Table 1. Initially the reaction was performed at 60° C. for 24 h to obtain high molecular weight PAN-r-PEGMA copolymers; the reaction was further carried out at 80° C. for an additional 16 h.

Scheme 1:

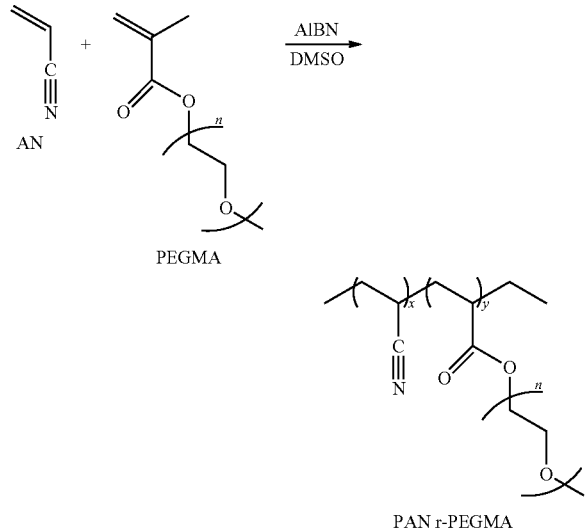

PAN-r-PEGMA copolymers were synthesized with different PEG compositions. Only the copolymers were considered, which were soluble in ethanol/water mixture. The copolymers reported in Table 1 were soluble in ethanol/water mixture at 80° C. and formed defect free composite membranes. The weight average molecular weight ($M_w$) and polydispersity index (PDI) of the synthesized copolymers obtained by GPC are given in Table 1. The $M_w$ of the copolymers were in the range of 43 kDa-56 kDa with PDI of 1.96-3.6.

Figure 4:
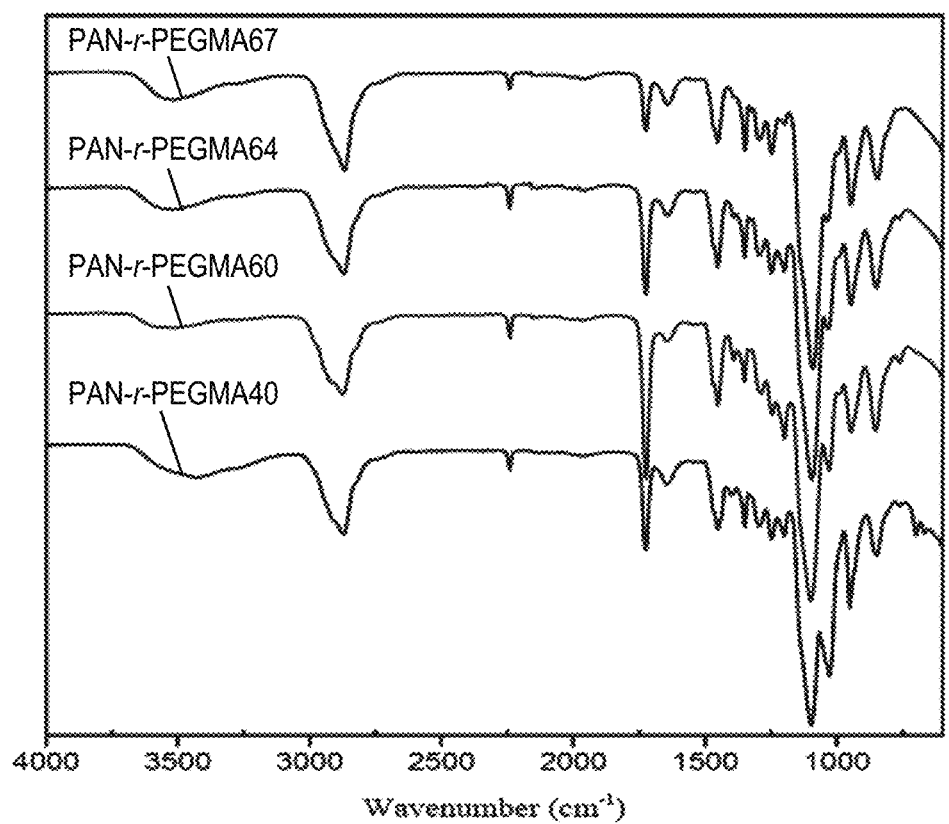
FIG. 4 is a graphical view of FTIR spectra for PAN-r-PEGMA copolymers, according to one or more embodiments of the present disclosure.

Synthesized PAN-r-PEGMA copolymers were analyzed by FTIR spectroscopy. FIG. 4 shows FTIR spectra of PAN-r-PEGMA copolymers with varied amount of PEG content. The sharp absorption bands at 2245, 1257 and 1033 cm$^{-1}$ were attributed to the stretching and bending vibrations of —C≡N of PAN segment. The strong band at 1081 cm$^{-1}$ corresponded to the C—O—C stretching vibration of the PEG moiety, which indicated that PEGMA monomers were well copolymerized with AN. In addition, the intensity of the peak at 1081 cm$^{-1}$ for C—O—C stretching increased in the order of PAN-r-PEGMA67>PAN-r-PEGMA64>PAN-r-PEGMA60>PAN-r-PEGMA40, indicating an increase in PEG content of the copolymer. A sharp band observed at 1722 cm$^{-1}$ was attributed to C=O stretching vibration of the acrylate ester group of PEGMA segment. The broad absorption bands at 2895 cm$^{-1}$ correspond to —C—H stretching vibration of methylene groups present in the backbone of the copolymer and the side chain of PEGMA segment.

Figure 5:
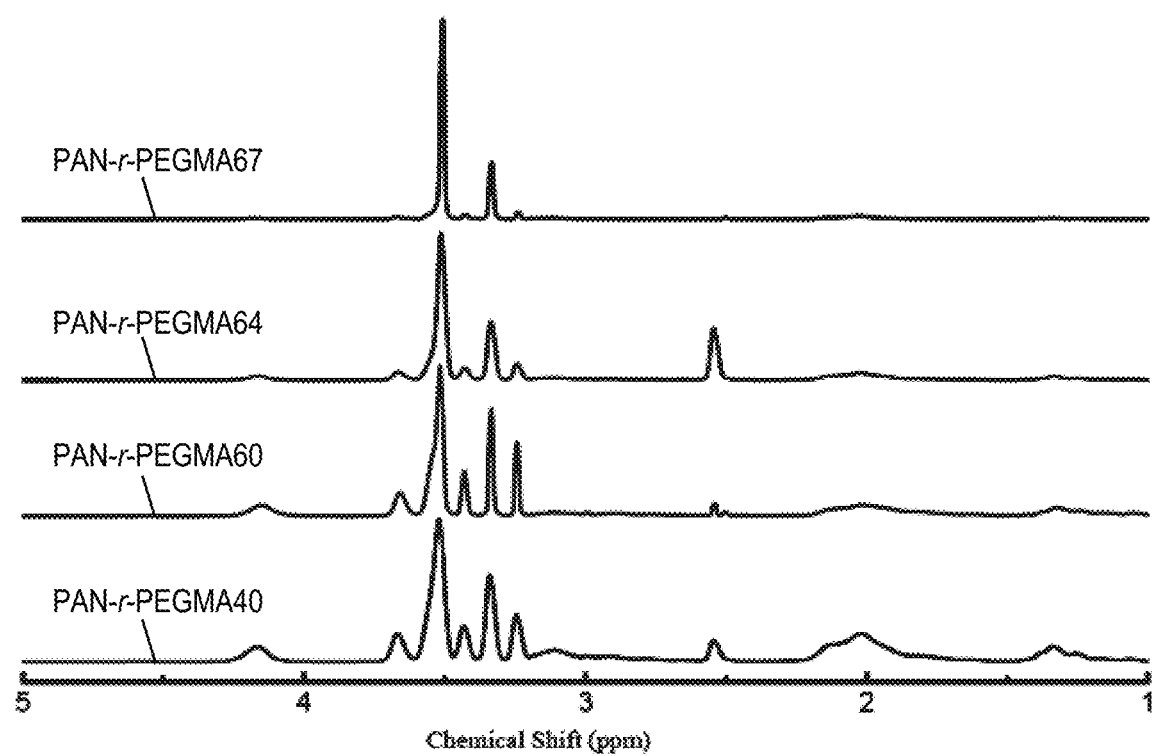
FIG. 5 is a graphical view of $^1$H NMR spectra for PAN-r-PEGMA copolymers in DMSO-d$^6$ solvent, according to one or more embodiments of the present disclosure.

In order to further confirm the formation of copolymers, all the polymers were investigated by NMR spectroscopy. The $^1$H-NMR spectra of the copolymers in DMSO-d$^6$ solvent are illustrated in FIG. 5.

The signals at δ=2.02 and 3.23 ppm were assigned to —CH$_2$— and —CH— protons of the PAN segment. The characteristic peaks at δ=4.16, 3.4-3.6, 2.11 and 1.32 ppm were due to —COO—CH$_2$, —CH$_2$—O—CH$_2$—CH— and —CH$_2$ protons of PEGMA segment in the copolymers. The peak of terminal —O—CH$_3$ group in PEGMA segment appears at 3.10 ppm. NMR spectra confirm the copolymerization between AN and PEGMA in presence of AIBN at elevated temperature. These results confirm successful synthesis of PAN-r-PEGMA copolymers from AN and PEGMA with various molecular weights via free radical polymerization reaction.

Figure 6:
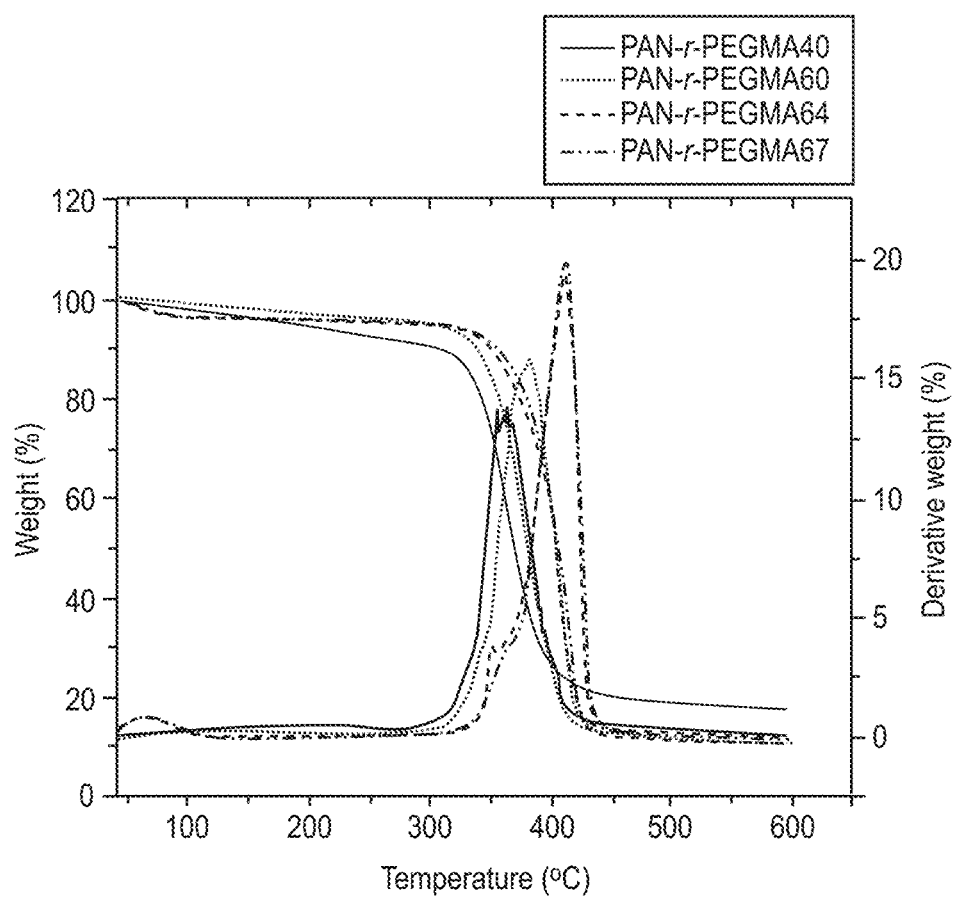
FIG. 6 is a graphical view of thermal gravimetric analysis and derivative (DTG) curves for PAN-r-PEGMA copolymers, according to one or more embodiments of the present disclosure.

The thermal analysis of PAN-r-PEGMA copolymers were studied in the temperature range of 25-600° C. at the heating rate of 5° C./min under nitrogen atmosphere. TGA thermograms of the copolymers are shown in FIG. 6. The weight loss (%) for PAN-r-PEGMA67 copolymer was noticed at 100° C.; this was understood as being due to the presence of moisture in the synthesized copolymer. It can be visualized that single stage decomposition of the copolymers started above 320° C. The thermal degradation temperature of the copolymers increased gradually with PEG content. The PAN-r-PEGMA64 and PAN-r-PEGMA67 copolymers were more thermally stable at least up to 356° C. in comparison to PAN-r-PEGMA40 and PAN-r-PEGMA60 copolymers. The increase in PEG content of the polymers usually decreased their thermal stability. However, here the thermal stability of the copolymers was enhanced with an increase in PEG content. Overall, TGA results indicated good thermal stability of the synthesized copolymers, which is attractive for a potential gas separation material. The $T_g$ values of the copolymers (see Table 1) were determined by DSC. The DSC thermograms for all the copolymers are presented in FIGS. 7A-7B.

Two glass transition temperatures were obtained for the copolymers i.e., $T_{g1}$ was observed in the range of −45 to −9° C. and $T_{g2}$ was in the range of 95-97° C. $T_{g1}$ values in the range of −45 to −9° C. was related to the presence of pendant PEG side chains of the copolymer backbone. $T_{g1}$ values declined on increase in PEG contents, this was understood as being due to the increased mobility of the pendant PEG chains, which enhanced the total free volume of the copolymers. This factor was mainly responsible for improvement in gas transport properties, which enhanced both solubility and diffusivity particularly for $CO_2$ gas.

PAN-r-PEGMA40, PAN-r-PEGMA60, and PAN-r-PEGMA64 did not show any strong endothermic peaks, corresponding to the crystalline melting of PEG. Therefore, all of the copolymers were in an amorphous state. Among them, only PAN-r-PEGMA67 showed a sharp melting point around 22° C., indicating partial crystalline nature of the PEG side chain. This may be due to the high molecular weight (950 Da) of the PEGMA monomer compared to other PEGMA monomers used for the copolymer preparation. In general, $T_{gAB}$ of the random copolymer (A-r-B) lies between $T_{gA}$ and $T_{gB}$. The $T_{gAB}$ value depends on the ratio of A and B monomers used in the copolymer synthesis. In this study, the copolymers were synthesized from AN and PEGMA monomers while $T_g$ values of the individual homopolymers are 95° C. (PAN) and −56° C. (PEGMA-300). $T_g$ values of the random copolymers were expected to be in between for the above-mentioned copolymers. However, $T_g$ values for all of the copolymers were observed around 95° C. (FIG. 7B), which indicated that the $T_g$ belonged to the segmental mobility of the main chain of PAN backbone. The PAN-r-PEGMA40 (low PEG content) copolymer showed a $T_g$ at 97° C. and for the PAN-r-PEGMA67 copolymer (high PEG content) at 95° C. A slight shift in the $T_g$ value in the range of 97-95° C. was observed as the amount of PEG of the copolymers increased. As described above, the crystalline nature of PEG molecules affected the gas transport properties.

Figure 8:
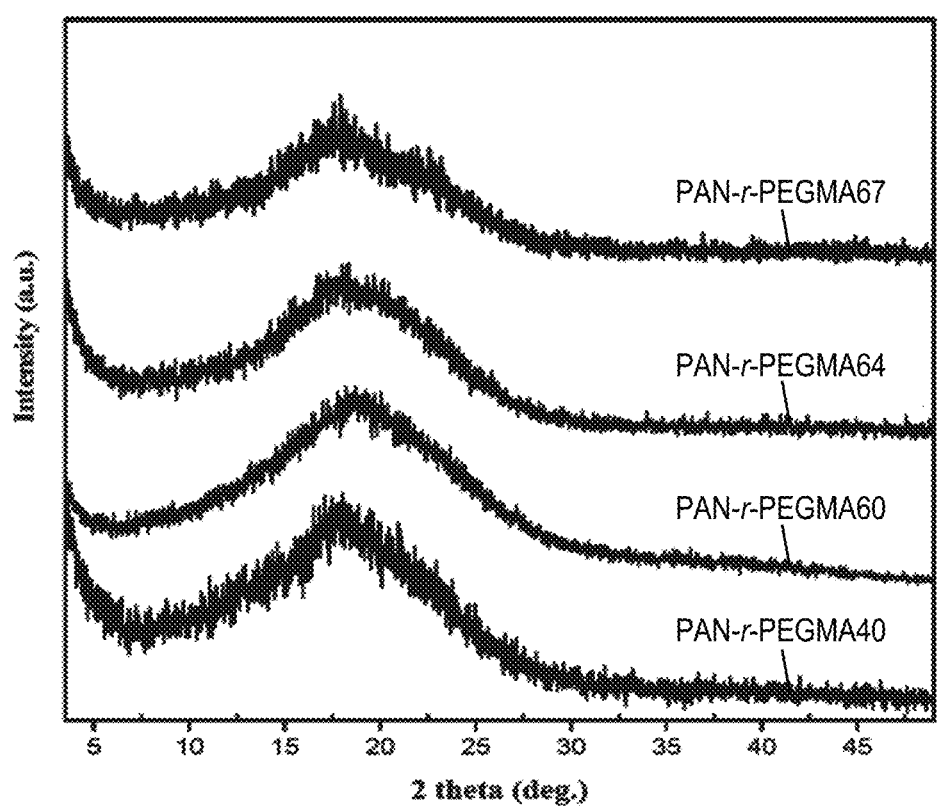
FIG. 8 is a graphical view of WXRD patterns for PAN-r-PEGMA copolymers, according to one or more embodiments of the present disclosure.
Figure 9A:
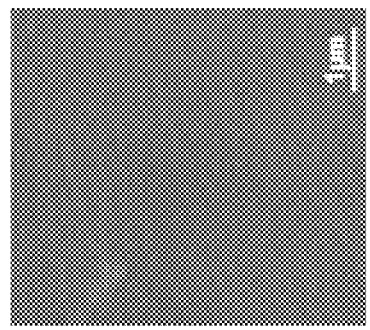
FIGS. 9A-9H are surface SEM and AFM images of PAN/PAN-r-PEGMA composite membranes (a,e) PAN-r-PEGMA40; (b,f) PAN-r-PEGMA60; (c,g) PAN-r-PEGMA64; (d,h) PAN-r-PEGMA67, according to one or more embodiments of the present disclosure.
Figure 9B:
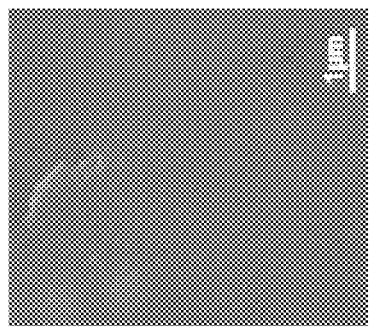
Figure 9C:
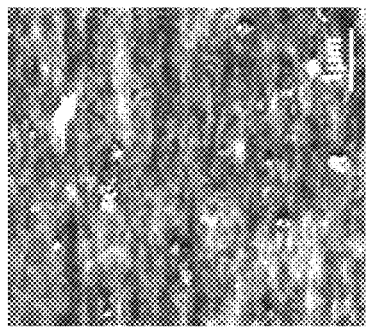
Figure 9D:
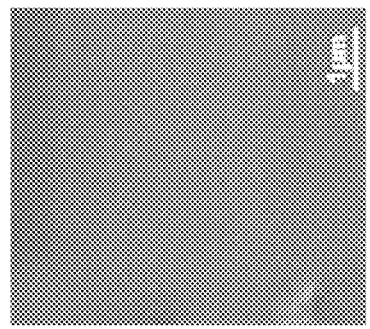
Figure 9E:
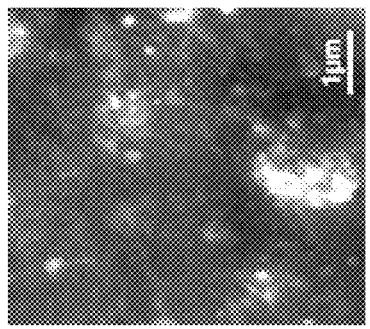
Figure 9F:
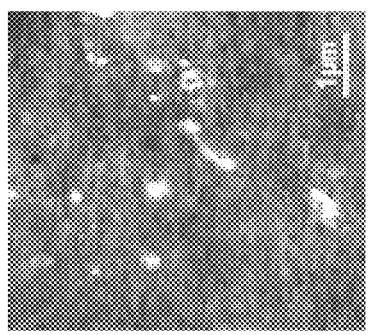
Figure 9G:
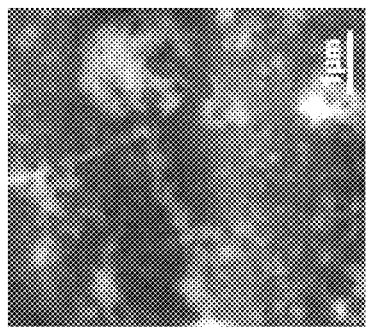
Figure 9H:
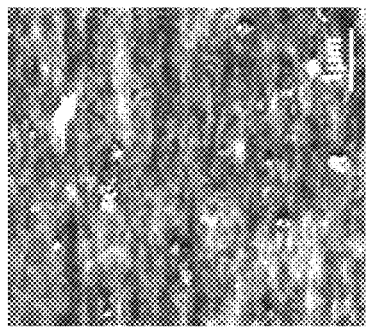
Figure 10A:
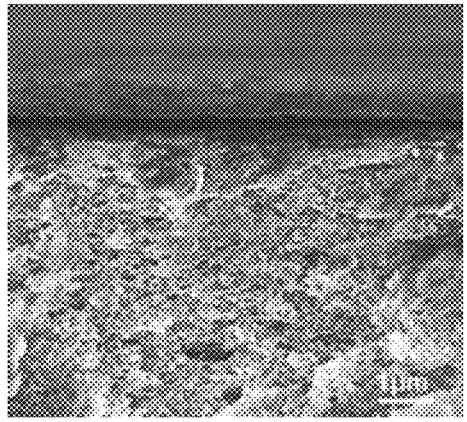
FIGS. 10A-10D are cross-section SEM images of the composite membrane (a) PAN-r-PEGMA40; (b) PAN-r-PEGMA60; (c) PAN-r-PEGMA64 and; (d) PAN-r-PEGMA67, according to one or more embodiments of the present disclosure.
Figure 10B:
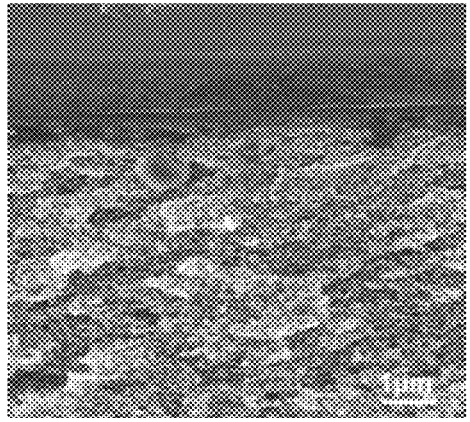
Figure 10C:
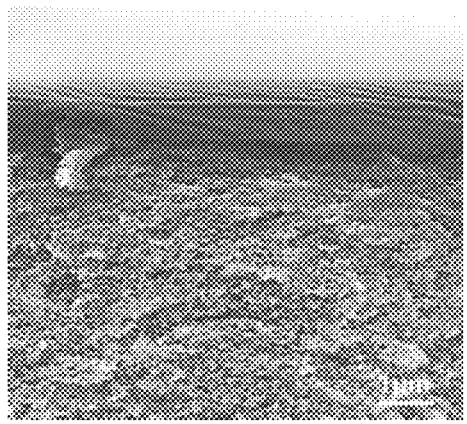
Figure 10D:
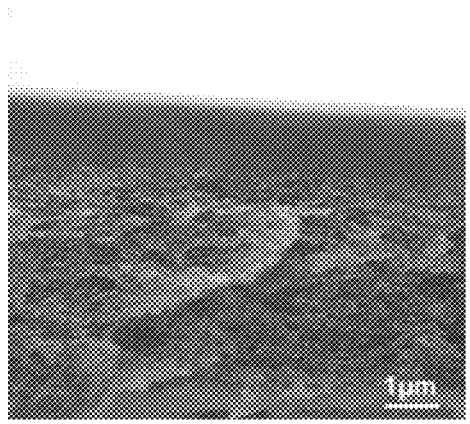

Wide angle XRD (WXRD) was employed to analyze the crystalline behavior of the copolymers. FIG. 8 shows WXRD patterns of the PAN-r-PEGMA copolymers in which the intensity of X-ray scattering was plotted against the diffraction angle 2θ. The broad 2θ peaks were observed near 18° and sharp crystalline peaks were absent in the WXRD patterns for all of the copolymers. This confirmed the amorphous nature of the synthesized copolymers.

Membrane Preparation and Morphology.

Thin film composite membranes were successful fabricated on porous PAN support membranes from a copolymer dissolved in an ethanol/water (70/30 v/v %) mixture by dip coating method.

Free-standing dense membranes were fabricated using a copolymer solution by solvent evaporation at 50° C. to investigate their gas transport properties. After the evaporation of solvent, the obtained dense membranes were flexible but sticky in nature. Therefore, the gas transport properties of the free-standing membranes could not be evaluated. The morphologies of the composite membranes were examined by scanning electron microscopy. All the membranes had smooth surface coating of PAN-r-PEGMA copolymers onto the top surface of porous PAN support membrane (FIG. 9A-9D). These images revealed the formation of a defect free selective layer of PAN-r-PEGMA copolymer onto the porous PAN support membrane through dip coating method. Microphase separation between PAN (relatively hydrophobic) and side chain PEG (hydrophilic) of the copolymers was expected to occur in the microdomains of the membrane selective layer due to the two glass transition temperatures of the copolymers. The microphase separation of the copolymers was investigated with AFM. The top surface layers of the composite membranes were imaged using AFM in a tapping mode. The microphase-separated morphology was observed for all the TFC membranes (FIG. 9E-9H). In order to see the adhesion of the copolymer selective layer with the porous PAN support layer, the membranes were fractured in liquid $N_2$ and the cross-section images are depicted in FIG. 10A-10D.

Very thin and smooth coating layers were clearly visible on the top of the porous PAN support membrane. In this study, one of the copolymer segments was PAN and the porous support layer was also PAN. Good compatibility between support and coating was expected, enhancing gas separation properties. The thickness of membrane selective layers was measured from cross-section SEM images and the obtained values are tabulated in Table 2. The selective layer thickness of the composite membranes was in the range of 1.2-1.4 μm.

TABLE 2

Membrane thickness, $CO_2$ gas permeability and selectivity.

| Membranes | Selective Layer Thickness (μm) | $P_{CO2}$ (Barrer) | Selectivity (α) $CO_2/N_2$ | $CO_2/CH_4$ | $CO_2/H_2$ |
|---|---|---|---|---|---|
| PAN-r-PEGMA40 | 1.32 | 2 | 52 | 28 | 1.6 |
| PAN-r-PEGMA60 | 1.35 | 10 | 53 | 25 | 3.7 |
| PAN-r-PEGMA64 | 1.23 | 20 | 60 | 23 | 5.9 |
| PAN-r-PEGMA67 | 1.36 | 69 | 65 | 20 | 9.8 |
| PEBAX1657 | 1.38 | 64 | 51 | 18 | 7.7 |

1 Barrer = $10^{-1}$ $cm^3$ (STP) cm/($cm^2$ s · cmHg).

Gas Transport Properties of the Composite Membrane.

Figure 11:
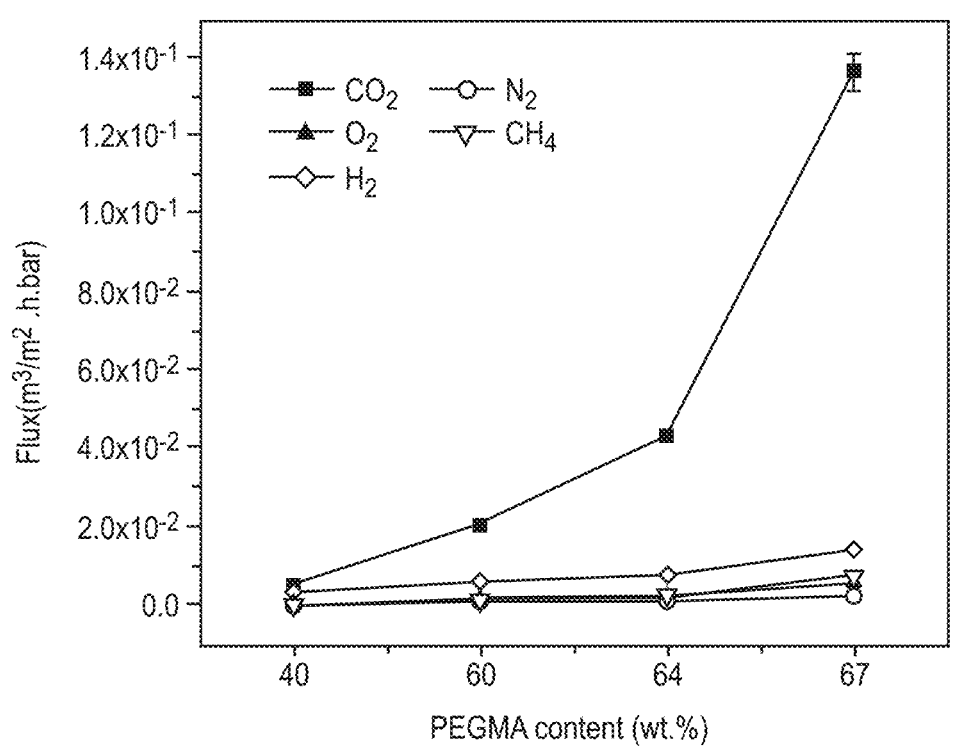
FIG. 11 is a plot of gas permeability against the content of PEGMA (wt %), according to one or more embodiments of the present disclosure.

Pure gas permeation properties of the composite membranes were determined using $N_2$, $O_2$, $H_2$, $CH_4$, and $CO_2$ gases at 25° C. FIG. 11 shows the gas permeability data for composite membranes fabricated from the series of PAN-r-PEGMA copolymers.

The order of gas permeability of the composite membranes at 25° C. is $CO_2>H_2>CH_4>O_2>N_2$, which was in good agreement with the reported data in the literature for PEG based polymers. All the composite membranes exhibited the same gas permeability trend ($CO_2>H_2>CH_4>O_2>N_2$) and the gas permeability of the composite membranes increased with increasing PEG content. The $CO_2$ permeability of composite membranes increased strongly with content of PEGMA monomer in the initial synthesis composition. This trend was similar to the other reported PEO block copolymer composite membranes. It was reported that the performance of the membranes based on PEO polymers was affected by the amount and molecular weight of PEO. The PAN-r-PEGMA derived composite membranes had good gas permeabilities. In particular, the PAN-r-PEGMA67 copolymer composite membrane had high gas permeability for all gases, especially for $CO_2$. The $CO_2$ gas flux of about $1.37 \times 10^{-1}$ $m^3/m^2$·h·bar was obtained for the PAN-r-PEGMA67 composite membrane.

In order to position PAN-r-PEGMA composite membrane in the PEG based polymer membrane library, the gas permeability of commercial PEBAX1657 (PEO content 60%) was compared to PAN-r-PEGMA composite membranes. The PEBAX1657 composite membranes were prepared on porous PAN support membrane by dip coating using 3 wt % of PEBAX1657 solution in ethanol/water (70/30 v/v %) mixture. The $CO_2$ flux of the PEBAX composite membrane was $1.25 \times 10^{-1}$ $m^3/m^2$·h·bar. These flux values revealed that the $CO_2$ flux and the order of gas permeability ($CO_2>H_2>CH4>O_2>N_2$) for the PAN-r-PEGMA67 composite membranes were similar to the PEBAX1657 composite membrane. However, the $CO_2$ gas permeability of the PAN-r-PEGMA40 composite membrane was 10 times lower than PEBAX1657 composite membrane permeability, which was due to low content of PEG (40%). These results clearly demonstrated the improvement in $CO_2$ gas permeability of the composite membranes through the ethylene oxide units of PEG segments. To calculate the membrane permeability coefficient, the thickness of the composite membranes obtained from SEM images were taken into account and calculated using the following steady-state permeability of gas equation:

$$P_A = \frac{N_A l}{p_{2A} - p_{1A}}$$

where $N_A$ is the steady state flux of gas through the membrane ($cm^3$ (STP)/$cm^2$ s), l is the membrane thickness (cm), and $p_{2A}$, $p_{1A}$, are the upstream and downstream pressures (cm Hg). The selective layer thickness of PAN-r-PEGMA composite membranes and their permeability data are included in Table 2. The ideal selectivity of the membrane for gas A over gas B is the ratio of their pure gas permeability $P_A$ and $P_B$ as given in Equation (3):

$$\propto_{\frac{A}{B}} = \frac{P_A}{P_B}$$

The gas pair selectivity was calculated by using Equation (3) and the obtained values are also tabulated in Table 2. The composite membranes exhibited high selectivity for the $CO_2/N_2$ gas pair. (Table 2). The $CO_2/N_2$ selectivities of the composite membranes increased as PEGMA content increased. The $CO_2/N_2$ selectivity of the PAN-r-PEGMA40 composite membrane was ~52, whereas the $CO_2/N_2$ selectivity of the PAN-r-PEGMA67 composite membrane was 65 due to the high content of PEGMA (950 Da) in the copolymer. The $CO_2/N_2$ selectivities of PAN-r-PEGMA composite membranes were higher than the selectivities of the membranes made from commercial PEBAX1657 (Table 2). Interestingly, the composite membrane with low content of PEGMA had better $CO_2/CH_4$ selectivity and the selectivity decreased as PEGMA content increased. In comparison to PEBAX1657 composite membrane, $CO_2/N_2$, $CO_2/CH_4$, and $CO_2/H_2$ selectivities of the PAN-r-PEGMA composite membranes were high. This revealed that PAN-r-PEGMA composite membranes were more $CO_2$-philic.

Figure 12:
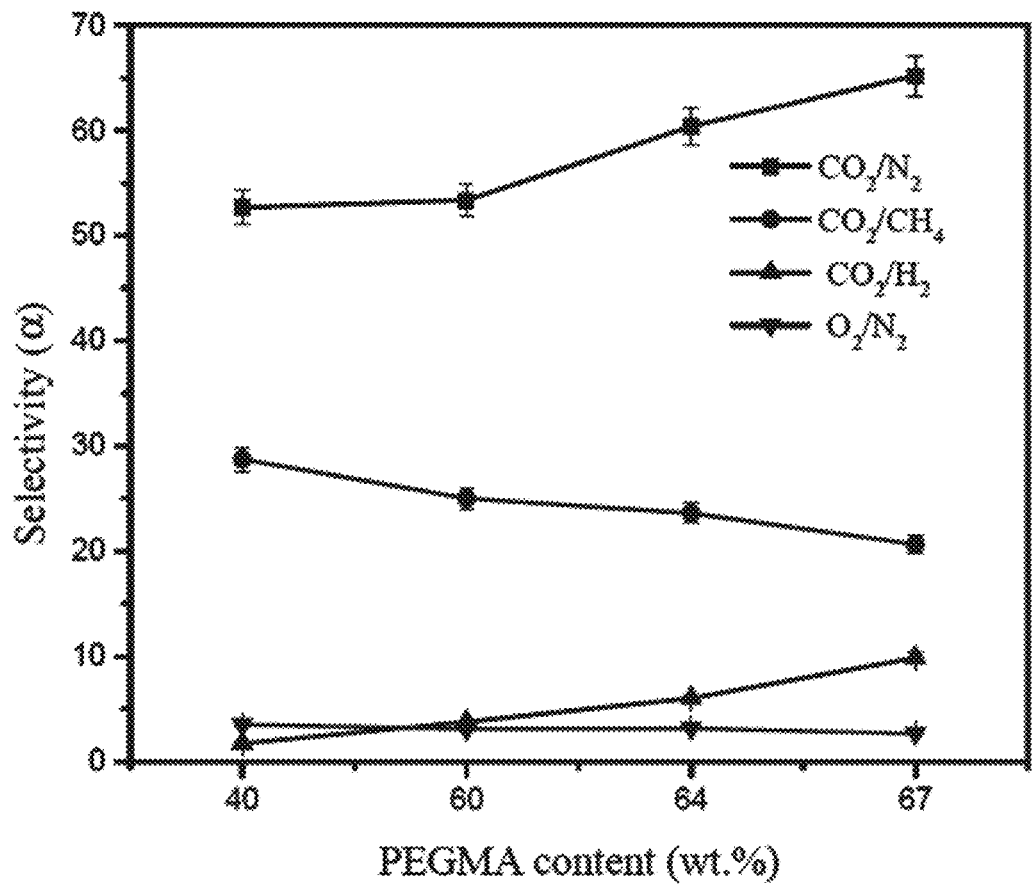
FIG. 12 is a plot of membrane gas selectivities versus content of PEGMA (wt. %), according to one or more embodiments of the present disclosure.

FIG. 12 shows an effect of PEGMA content on gas selectivities of the composite membranes. PAN-r-PEGMA composite membranes were observed to have reasonable $O_2/N_2$ gas selectivities, which ranged from 2.3-3.5. From FIG. 12, it was observed that the selectivities of $CO_2/CH_4$ and $O_2/N_2$ decreased with increasing PEGMA content. However, the $CO_2/N_2$ and $CO_2/H_2$ selectivities increased with PEGMA content. To study an effect of the selective layer thickness, the PAN-r-PEGMA67 copolymer was selected and the coating solution thickness was varied by dip coating using different copolymer concentrations (1 to 3 wt %) in ethanol/water mixture.

Figure 13:
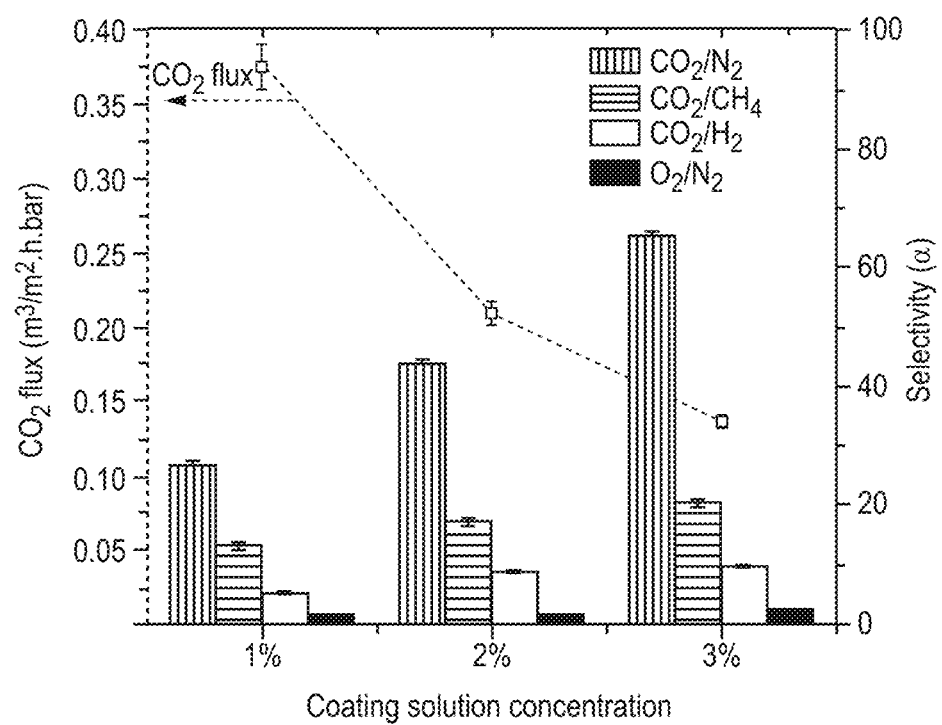
FIG. 13 is a graphical view showing the effect of $CO_2$ flux and gas selectivities at various concentration of PAN-r-PEGMA67 copolymer coating solution, according to one or more embodiments of the present disclosure.

FIG. 13 shows the plot of different concentration of copolymer coating solution versus $CO_2$ flux and gas pair selectivity. The selective layer thickness played a crucial role for gas flux and selectivity of the composite membranes. An increase in $CO_2$ flux was observed as the concentration of the copolymer coating solution decreased because of the reduced thickness of the selective layer. The $CO_2$ permeability of the PAN-r-PEGMA67 composite membrane improved from $1.37 \times 10^{-1}$ to $3.75 \times 10^{-1}$ $m^3/m^2 \cdot h \cdot bar$ when 1 wt % copolymer solution was coated on the porous PAN support membrane. On the other hand, the selectivity of these membranes was extensively influenced by a thickness of copolymer coating layer. The $CO_2/N_2$ and $CO_2/CH_4$ selectivity decreased from 65-22 and from 20-13, respectively, for the composite membranes prepared from 1 wt % PAN-r-PEGMA67 copolymer solution. This decrease in selectivity was due to the formation of pin holes in the top layer of the composite membranes at low concentration of PAN-r-PEGMA67 copolymer solution. PAN-r-PEGMA copolymers were flexible and soft and it was investigated whether the fabricated TFC membranes were stable for long-term gas separation application.

Figure 14:
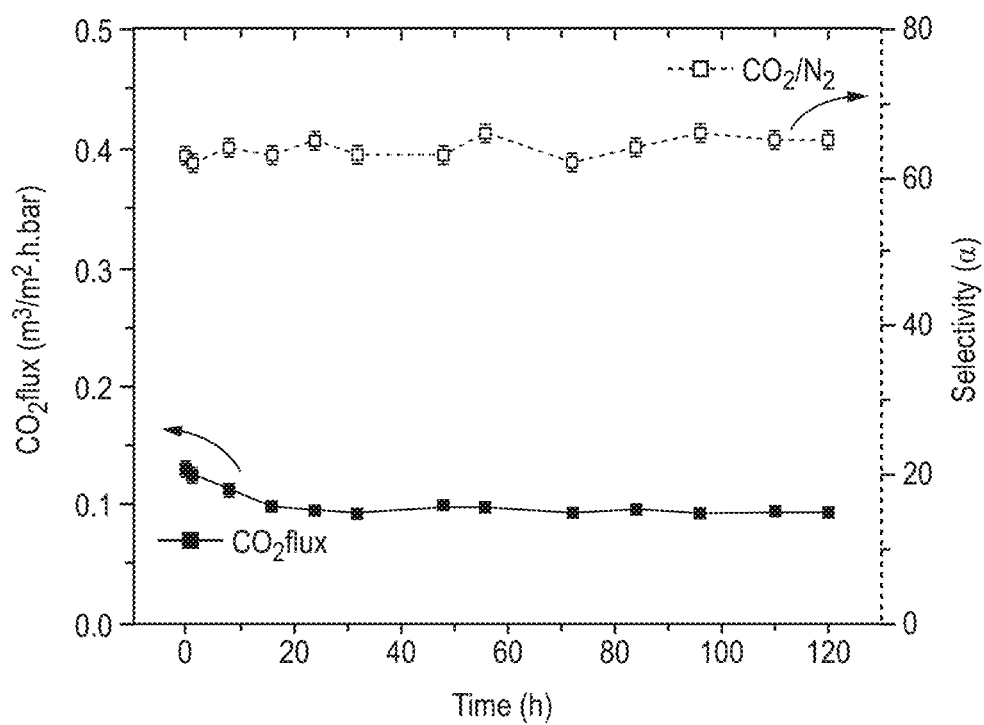
FIG. 14 is a graphical view showing long-term operation test for permeability of $CO_2$ and $N_2$ gas and the paired gas selectivity for PAN-r-PEGMA67 composite membrane (gas permeation tests were conducted at 25° C. and 0.5 bar), according to one or more embodiments of the present disclosure.

To test the long-term stability, the PAN-r-PEGMA67 composite membrane was tested in the time lag machine for 120 h. The membranes were kept under vacuum in the membrane test chamber throughout testing and the individual permeance of $CO_2$ and $N_2$ gases was measured at various time intervals for 120 h. The measured $CO_2$ flux and $CO_2/N_2$ selectivity at various time intervals up to 120 h are illustrated in FIG. 14. FIG. 14 shows that an initial $CO_2$ flux for PAN-r-PEGMA67 composite membrane was 1.37 a $10^{-1}$ $m^3/m^2 \cdot h \cdot bar$ and a slight decline in the $CO_2$ flux ($0.93 \times 10^{-1}$ $m^3/m^2 \cdot h \cdot bar$) was observed until 32 h and afterwards a stable flux with slightly reduction in $CO_2$ flux was achieved up to 120 h. However, the $CO_2/N_2$ selectivity of the PAN-r-PEGMA67 composite membrane remained in the range of 63-66. These results proved that PAN-r-PEGMA composite membranes were stable for long-term separation application.

In summary, a new gas separation membrane material was designed with enhanced gas transport properties. PAN-r-PEGMA copolymers were synthesized through a free radical polymerization at 80° C. in a presence of AIBN initiator. The amount of PEG segments in the various copolymers was varied by altering the molar composition of AN and PEGMA monomers in a reaction mixture. Thin film composite membranes on the porous PAN support membranes were successfully fabricated from PAN-r-PEGMA copolymers solution in an ethanol/water (70/30 v/v %) mixture by dip coating at RT. The selective layer thickness depended on the concentration of the PAN-r-PEGMA copolymer coating solution. The defect free selective layer was attained from 3 wt % PAN-r-PEGMA copolymer solution in an ethanol/water (7:3 w/w) mixture. The gas fluxes were significantly affected by the PEGMA content of the copolymers. Both $CO_2$ permeance and $CO_2/N_2$ selectivity were enhanced with an increase in PEGMA content. The PAN-r-PEGMA67 composite membrane exhibited a high $CO_2$ permeance of $1.37 \times 10^{-1}$ $m^3/m^2 \cdot h \cdot bar$ and an ideal $CO_2/N_2$ selectivity of 65. The $CO_2$ gas permeance and the $CO_2/N_2$ selectivity for PAN-r-PEGMA67 composite membrane were slightly higher than the values obtained with membranes made in the same way using commercially available PEBAX1657. PAN-r-PEGMA67 composite membranes have great potential for use in $CO_2$ separation owing to their excellent selectivity, permeability and easy scalability.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A thin film composite membrane, comprising:
 a porous polymer support selected from polyacrylonitrile, polysulfone, polyetherimide, and polyvinyl difluoride; and
 a $CO_2$-philic defect-free selective layer comprising a polyacrylonitrile-r-methacrylate polyethylene glycol (PAN-r-PEGMA) copolymer, wherein the selective layer is characterized by:
 a thickness in the range of 1.2 μm to 1.5 μm; and
 a molecular weight in the range of 40 to 60 kDa.

2. The membrane of claim 1, wherein the porous support includes PAN.

3. The membrane of claim 1, wherein a thickness of the porous support ranges from 150 μm to 200 μm.

4. The membrane of claim 1, wherein the polyether-based copolymer is one or more of PAN-r-PEGMA40, PAN-r-PEGMA60, PAN-r-PEGMA64, and PAN-r-PEGMA67.

5. The membrane of claim 1, wherein the membrane exhibits a gas permeability in an order of $CO_2 > H_2 > CH_4 > O_2 > N_2$.

6. The membrane of claim 1, wherein the membrane exhibits a selectivity of $CO_2/N_2 > CO_2/CH_4 > CO_2/H_2$.

7. A method of fabricating a thin-film composite membrane, comprising:
 dissolving a polyacrylonitrile-r-methacrylate polyethylene glycol (PAN-r-PEGMA) copolymer in one or more of an alcohol and alcohol-water mixture to form a copolymer solution; and
 immersing or partially immersing a porous polymer support in the copolymer solution to form, by dip-coating, a $CO_2$-philic defect-free thin-film composite membrane.

8. The method of claim 7, wherein the dissolving proceeds at a temperature of 80° C.

9. The membrane of claim 7, wherein a concentration of the PAN-r-PEGMA copolymer in the copolymer solution ranges from 1 wt. % to 3 wt. %.

10. The membrane of claim 7, wherein the alcohol-water mixture is an ethanol-water mixture.

11. The membrane of claim 7, wherein a ratio of alcohol to water in the alcohol-water mixture is 7:3 w/w.

12. The method of claim 7, wherein the porous support includes PAN.

13. A method of capturing one or more chemical species, comprising:
 contacting a thin-film composite membrane comprising PAN-r-PEGMA with a fluid composition, wherein the fluid composition includes at least $CO_2$, and
 capturing $CO_2$ from the fluid composition.

14. The method according to claim 13, wherein the fluid composition further includes one or more of $H_2$, $CH_4$, $O_2$, and $N_2$.

* * * * *